(12) United States Patent
Amitai et al.

(10) Patent No.: US 11,640,065 B2
(45) Date of Patent: *May 2, 2023

(54) COMPACT HEAD-MOUNTED DISPLAY SYSTEM

(71) Applicant: OORYM OPTICS LTD., Rehovot (IL)

(72) Inventors: Yaakov Amitai, Rehovot (IL); Nadav Amitai, Rehovot (IL)

(73) Assignee: OORYM OPTICS LTD., Rehovot (IL)

(*) Notice: Subject to any disclaimer, the term of this patent is extended or adjusted under 35 U.S.C. 154(b) by 0 days.

This patent is subject to a terminal disclaimer.

(21) Appl. No.: 17/868,645

(22) Filed: Jul. 19, 2022

(65) Prior Publication Data

US 2022/0365352 A1 Nov. 17, 2022

Related U.S. Application Data

(60) Division of application No. 17/154,405, filed on Jan. 21, 2021, now Pat. No. 11,442,276, which is a (Continued)

(30) Foreign Application Priority Data

Feb. 18, 2016 (IL) .......................................... 244181

(51) Int. Cl.
*G02B 27/01* (2006.01)
*G02B 6/00* (2006.01)
*F21V 8/00* (2006.01)

(52) U.S. Cl.
CPC ........... *G02B 27/0172* (2013.01); *G02B 6/00* (2013.01); *G02B 6/0031* (2013.01);
(Continued)

(58) Field of Classification Search
CPC .... G02B 27/0172; G02B 6/00; G02B 6/0031; G02B 6/0053; G02B 6/0055;
(Continued)

(56) References Cited

U.S. PATENT DOCUMENTS 8,390,933 B2 3/2013 Tanaka
8,432,614 B2 4/2013 Amitai
(Continued)

OTHER PUBLICATIONS

European Patent Office, European International Search Report and Written Opinion of the International Searching Authority, PCT/IL2017/050194, dated May 31, 2017, 17 pages.

*Primary Examiner* — John Bedtelyon

(57) ABSTRACT

An optical device, having at least first and second light-transmitting substrates, each having at least two external surfaces and an input aperture and an output aperture. The external surface of the first light-transmitting substrate is optically cemented to an external surface of the second light-transmitting substrate by an optical adhesive defining an interface plane. The refractive index of the optical adhesive is substantially lower than the refractive index of the first substrate. Part of the light waves entering the device through the input aperture and exiting the device through the output aperture impinge on the interface plane of the first substrate having incidence angles smaller than the critical angle. Another part of the light waves impinging on the interface plane have incidence angles higher than the critical angle. The interface plane is substantially transparent for the light waves impinging on interface plane having incidence angles smaller than the critical angle.

14 Claims, 22 Drawing Sheets

Related U.S. Application Data continuation of application No. 16/717,773, filed on Dec. 17, 2019, now Pat. No. 10,983,353, which is a continuation of application No. 15/999,300, filed as application No. PCT/IL2017/050194 on Feb. 15, 2017, now Pat. No. 10,564,430.

(52) U.S. Cl.
CPC ......... *G02B 6/0053* (2013.01); *G02B 6/0055* (2013.01); *G02B 6/0065* (2013.01); *G02B 2027/0123* (2013.01); *G02B 2027/0125* (2013.01)

(58) Field of Classification Search
CPC .......... G02B 6/0065; G02B 2027/0123; G02B 2027/0125; G02B 6/0033
See application file for complete search history.

(56) References Cited

U.S. PATENT DOCUMENTS

| | | |
|---|---|---|
| 10,564,430 B2 * | 2/2020 | Amitai ................. G02B 6/0031 |
| 2007/0047091 A1 | 3/2007 | Spitzer et al. |
| 2010/0066926 A1 | 3/2010 | Tanijiri |
| 2012/0057253 A1 | 3/2012 | Takagi et al. |
| 2012/0200938 A1 * | 8/2012 | Totani ................. G02B 27/0172 359/633 |
| 2012/0242561 A1 | 9/2012 | Sugihara |

* cited by examiner

COMPACT HEAD-MOUNTED DISPLAY SYSTEM

CROSS-REFERENCE TO RELATED APPLICATION

This is a divisional of U.S. application Ser. No. 17/154,405, filed Jan. 21, 2021 for "COMPACT HEAD-MOUNT DISPLAY SYSTEM", which is a continuation of U.S. Pat. No. 10,983,353 granted Apr. 20, 2021 for "COMPACT HEAD-MOUNT DISPLAY SYSTEM", which is a continuation of U.S. Pat. No. 10,564,430 granted Feb. 18, 2020 for "COMPACT HEAD-MOUNTED DISPLAY SYSTEM", which are all hereby incorporated by reference herein.

FIELD OF THE INVENTION

The present invention relates to substrate light waves guided optical devices, and particularly to devices which include a reflecting surface carried by a light-transmissive substrate.

The invention can be implemented to advantage in a large number of imaging applications, such as, head-mounted and head-up displays, cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), or a scanning source and similar devices, or indirectly, by means of a relay lens, or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays but especially in head-mounted applications, wherein the system should be as light and compact as possible.

The strive for compactness has led to several different complex optical solutions, all of which, on the one hand, are still not sufficiently compact for most practical applications, and on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even for small movements of the optical system relative to the eye of the viewer, and do not allow sufficient pupil motion for conveniently reading text from such displays.

DISCLOSURE OF THE INVENTION

The present invention facilitates the provision of compact substrates for, amongst other applications, EIMDs. The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations, and yet it can be readily incorporated, even into optical systems having specialized configurations.

A further application of the present invention is to provide a compact display with a wide FOV for mobile, hand-held applications such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically compact display with a large virtual image. This is a key feature in mobile communications, and especially for mobile internet access, solving one of the main limitations for its practical implementation. Thereby the present invention enables the viewing of digital content of a full format internet page within a small, hand-held device, such as a cellular phone.

A broad object of the present invention is, therefore, to alleviate the drawbacks of state-of-the-art compact optical display devices and to provide other optical components and systems having improved performance, according to specific requirements.

In accordance with the present invention there is therefore provided an optical device, including at least first and second light-transmitting substrates each having at least two external surfaces, and further comprising an input aperture and an output aperture, wherein an external surface of the first light-transmitting substrate is optically cemented to an external surface of the second light-transmitting substrate by means of an optical adhesive defining an interface plane, the substrates and the optical adhesive u) having a refractive index, the refractive index of the optical adhesive is substantially lower than the refractive index of the first substrate defining a critical angle of the interface plane, part of the light waves entering the device through the input aperture and exiting the device through the output aperture, impinge on the interface plane of the first substrate having incidence angles smaller than the critical angle, another part of the light waves impinging on the interface plane, having incidence angles higher than the critical angle, and the interface plane is substantially transparent for the light waves impinging on the interface plane having incidence angles smaller than the critical angle.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented to provide what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of an exemplary prior art light-guide optical element;

FIGS. 2A and 2B are diagrams illustrating detailed sectional views of an exemplary prior art array of selectively reflective surfaces;

FIG. 3 is a schematic sectional-view of a prior art reflective surface with two different impinging rays;

FIGS. 4A and 4B illustrate sectional views of a transparent substrate having coupling-in and coupling-out surfaces, according to the present invention;

FIGS. 5A, 5B, 5C and 5D are schematic sectional-views of folding reflecting surfaces which re-direct the coupled-out light waves into the viewer's eye, according to the present invention;

FIG. 6 is a graph illustrating the reflection of incident light waves on an interface plane as a function of the incident angle, according to the present invention;

FIG. 7 is a graph illustrating the reflection of incident light waves on the coupling-out reflecting surface as a function of the incident angle, according to the present invention;

FIGS. 8A, 8B and 8C illustrate sectional views of optical modules in which correcting lenses are attached to the main transparent substrate, according to the present invention;

FIGS. 9A, 9B, 9C and 9D illustrate sectional views of non-active parts of the coupling-out surfaces and methods to block it (9A-9C), or alternately, to utilize it (9D), according to the present invention;

FIGS. 10A and 10B illustrate sectional views of transparent substrates, where two light rays coupled into the substrate remotely separated from each other are, coupled-out adjacent to each other, according to the present invention;

FIGS. 11A, 11B, 11C and 11D are schematic sectional-views of optical devices in which two different transparent substrates are optically attached together, according to the present invention;

Figure 13:
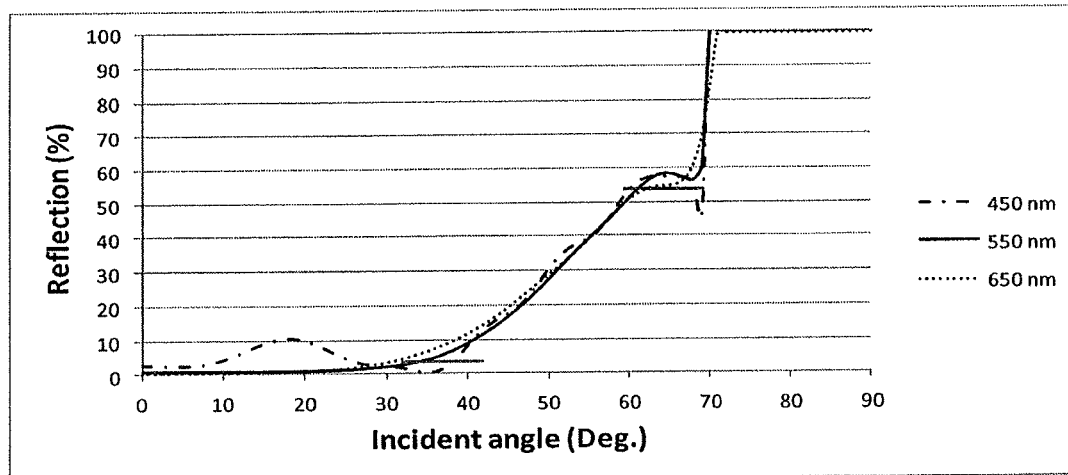
Figure 14:
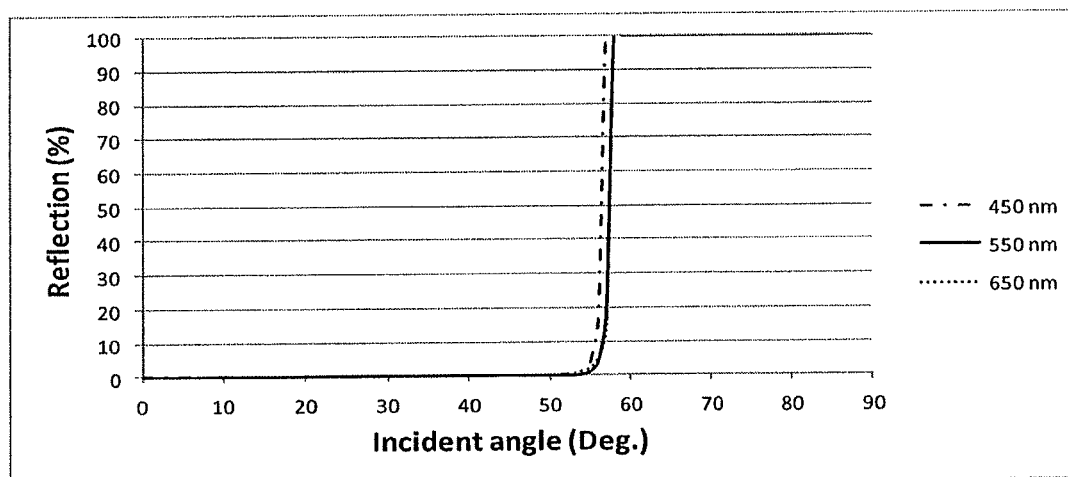
Figure 15A:
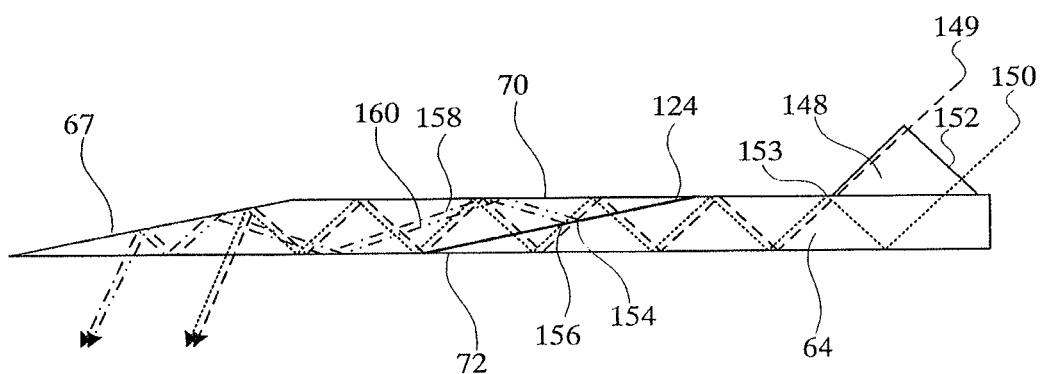
Figure 15B:
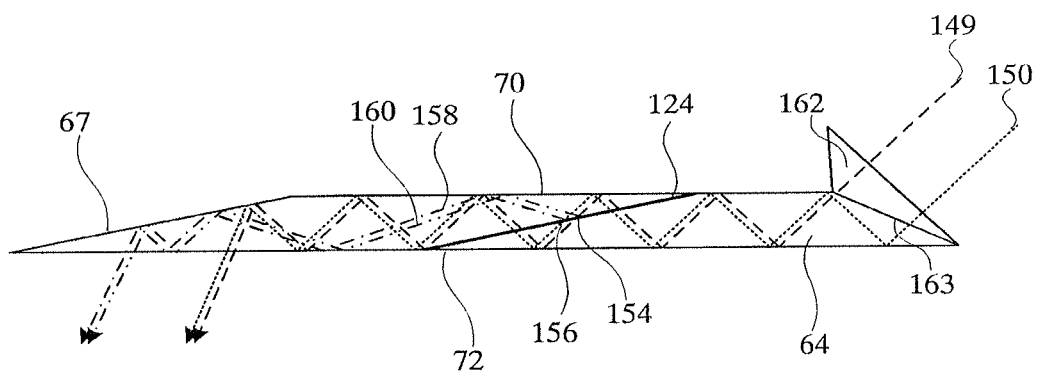
Figure 16A:
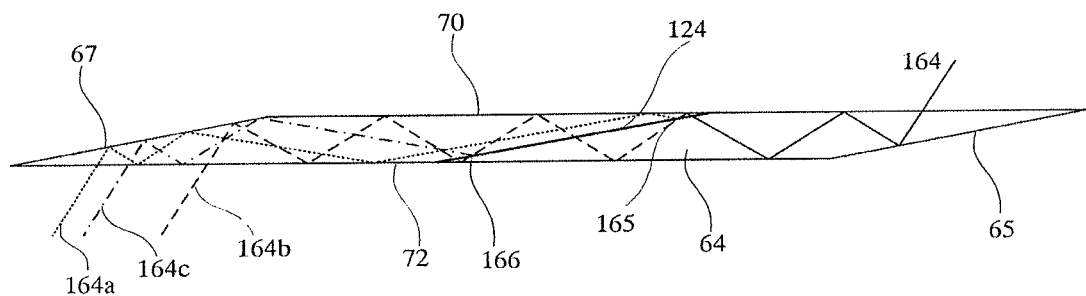
Figure 16B:
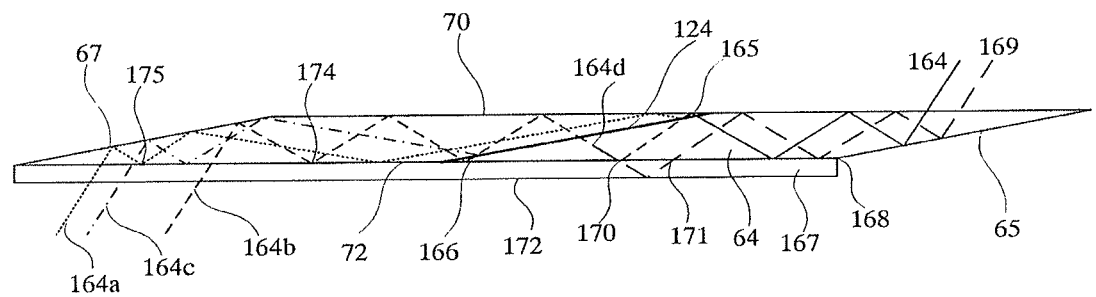
Figure 16C:
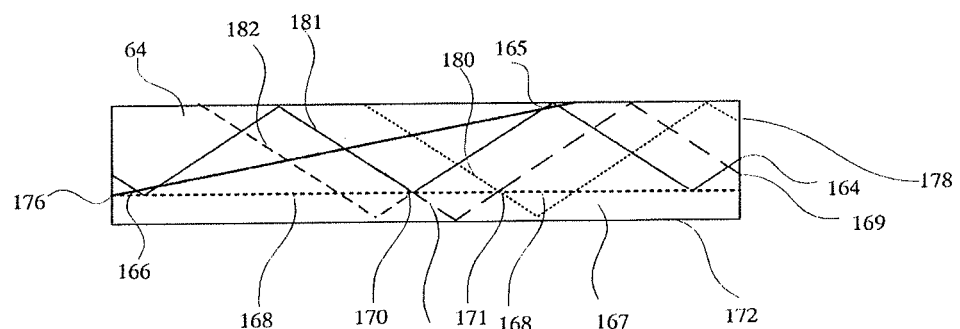
Figure 17:
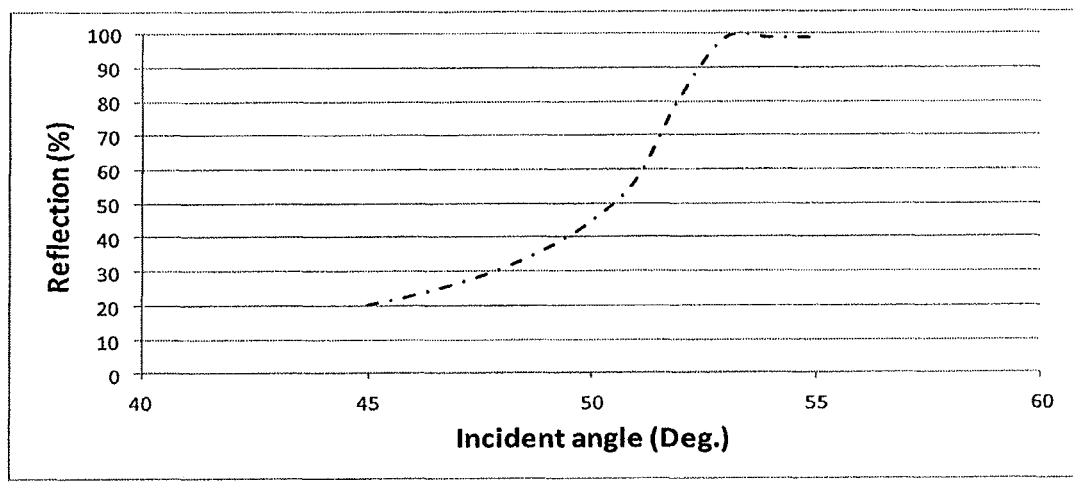
Figure 18A:
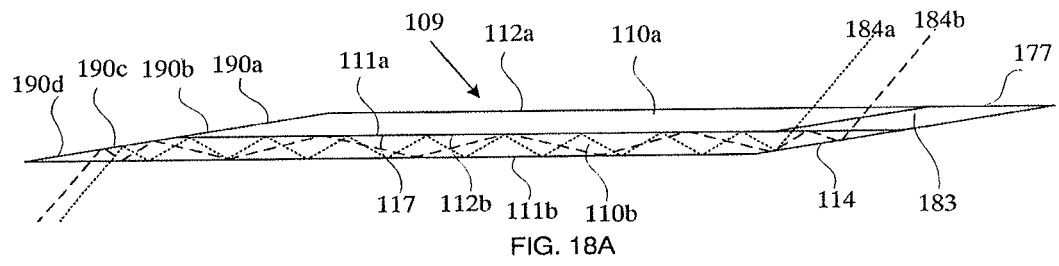
Figure 18B:
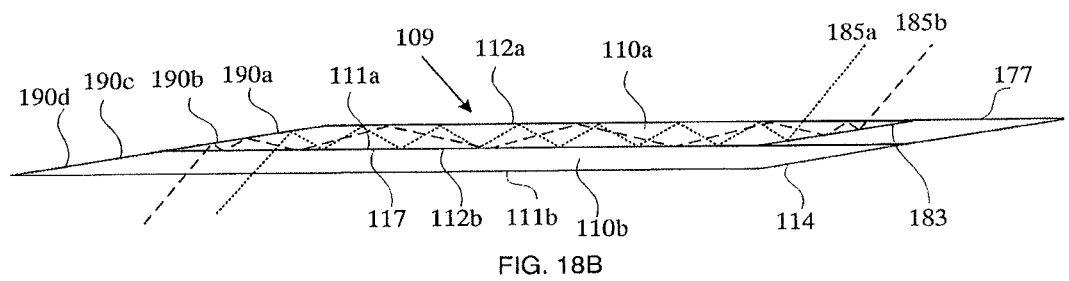
Figure 18C:
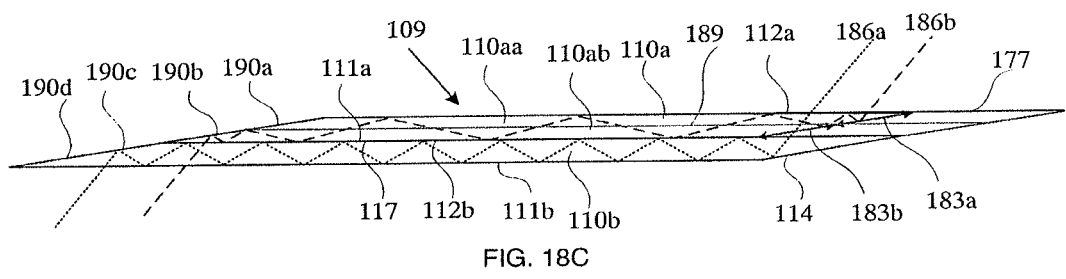
Figure 19:
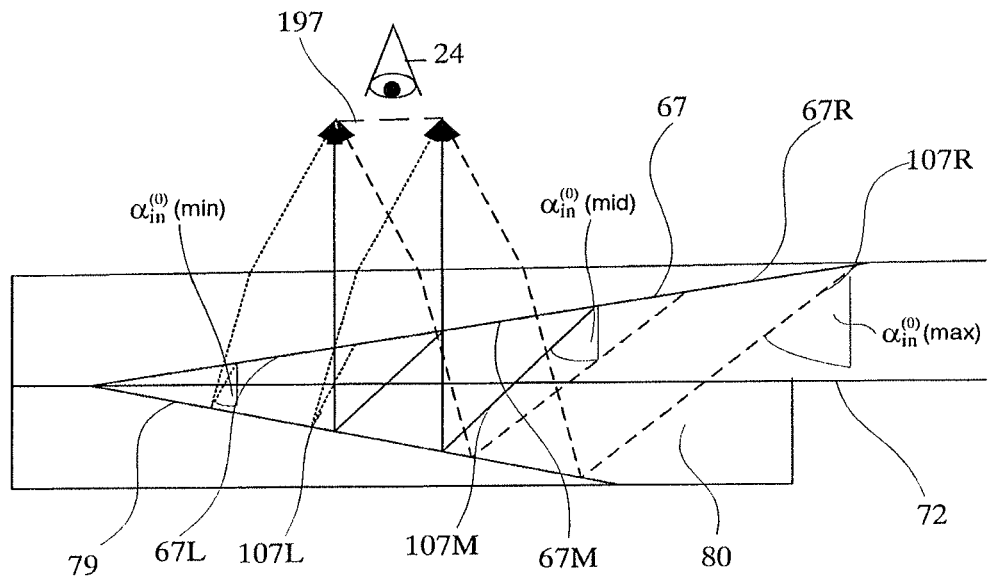
Figure 22:
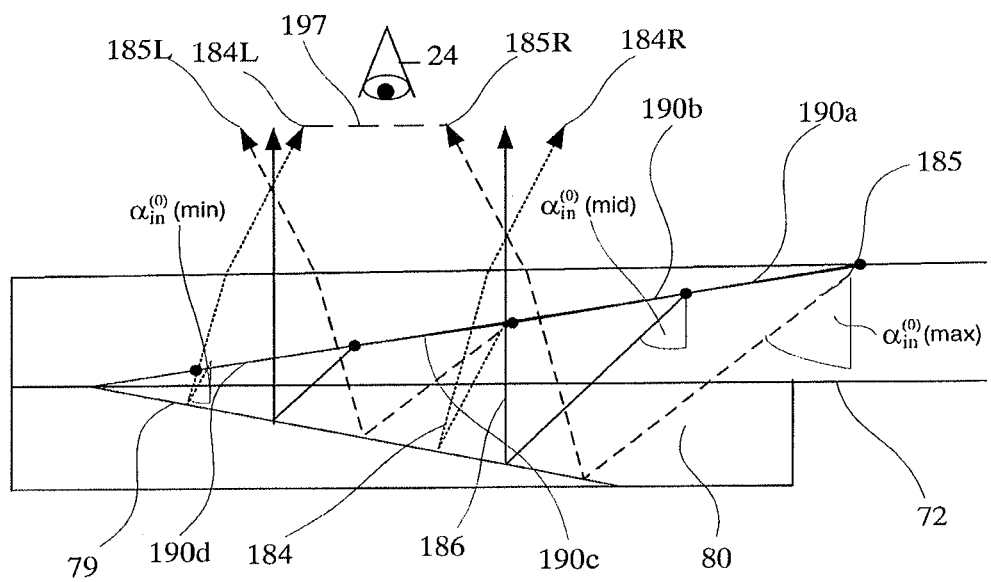
Figure 20A:
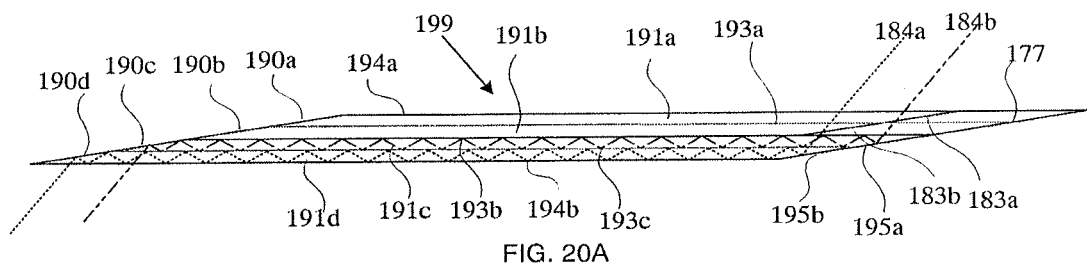
Figure 20B:
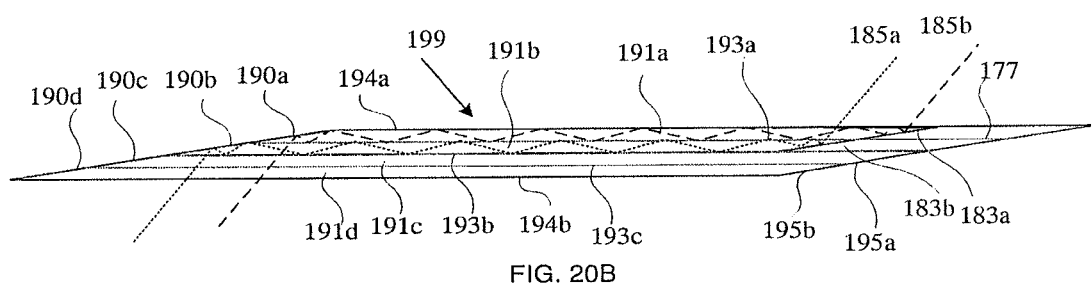
Figure 20C:
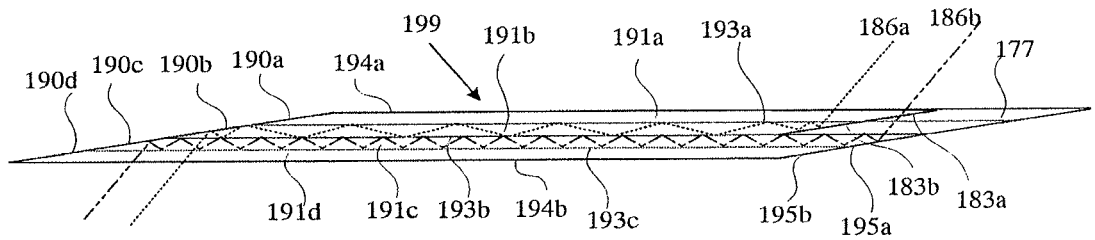
Figure 21A:
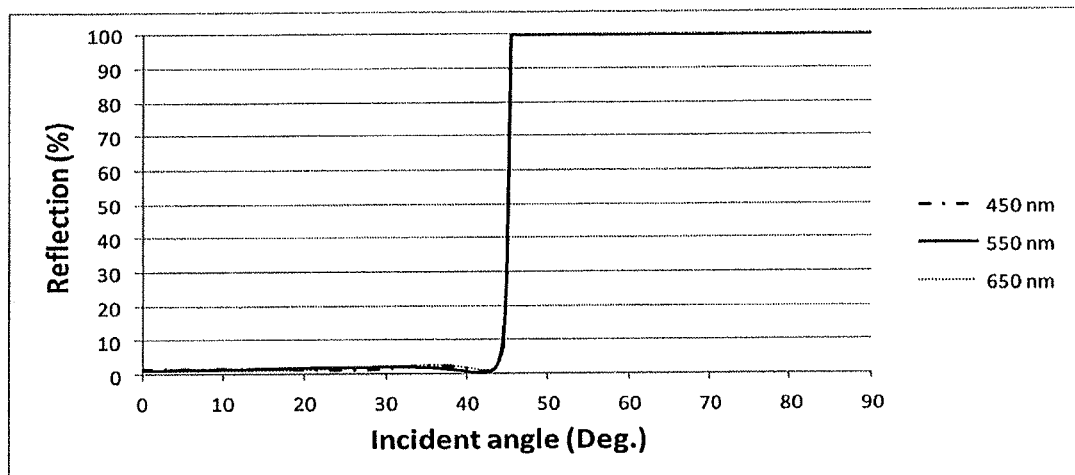
Figure 21B:
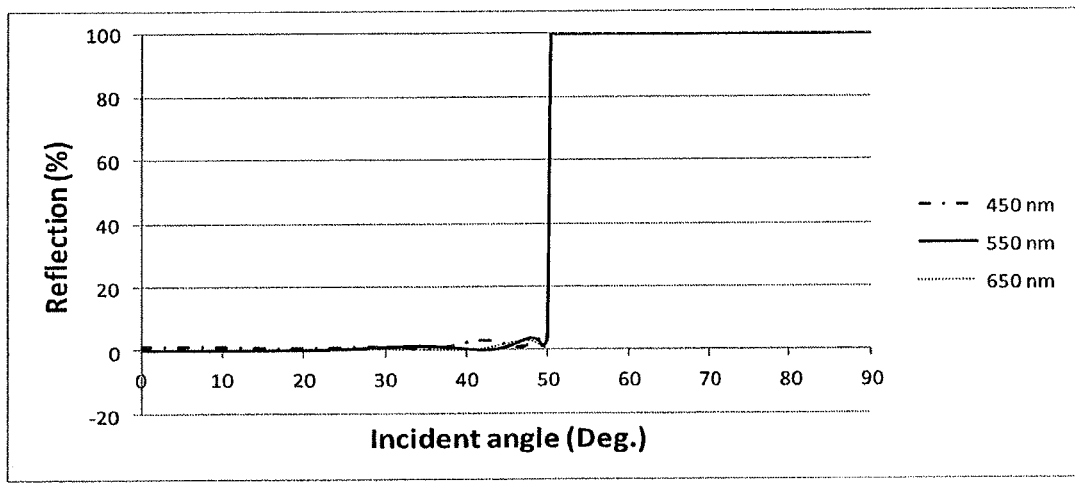
Figure 23A:
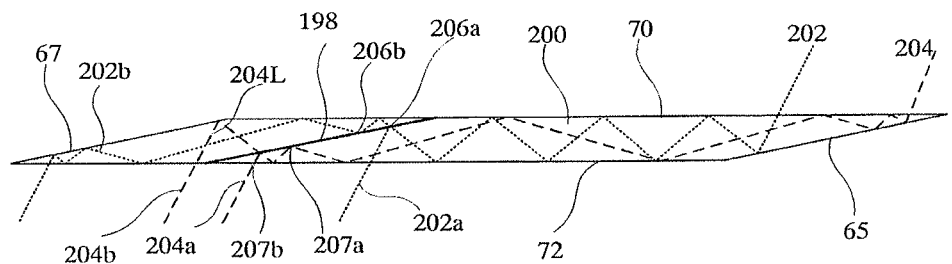
Figure 23B:
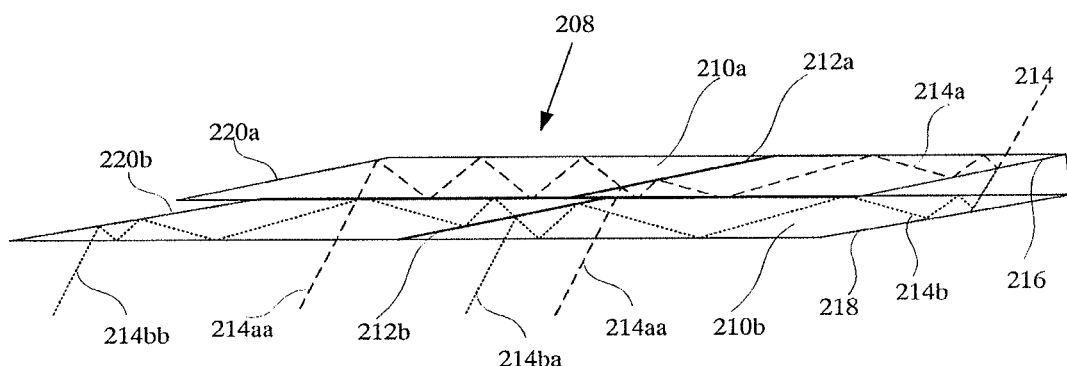
Figure 23C:
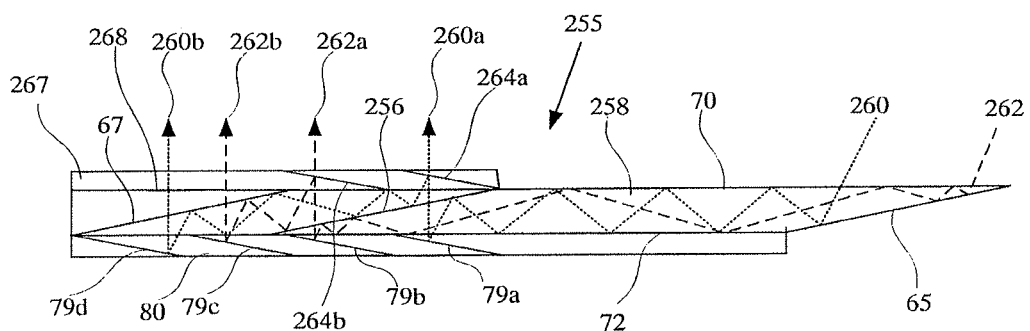
Figure 24:
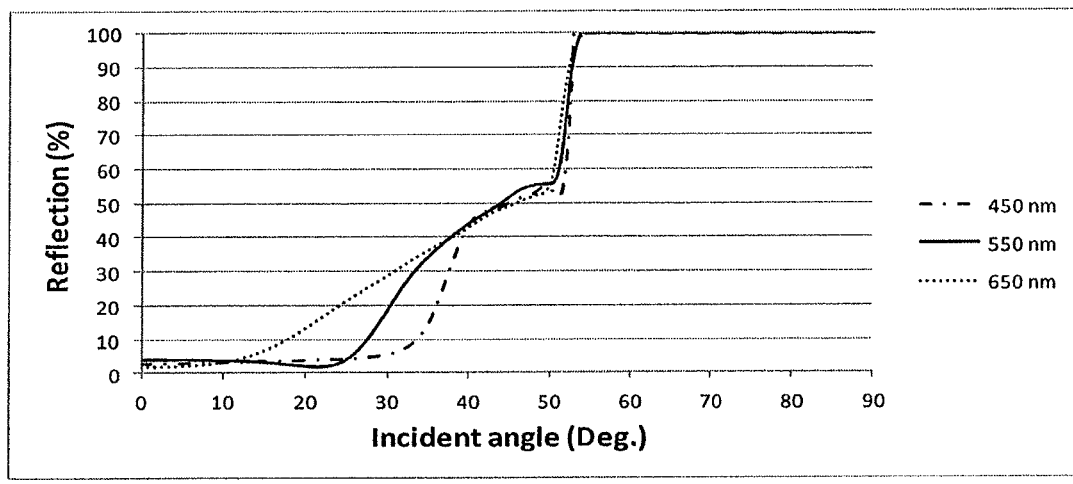
Figure 25A:
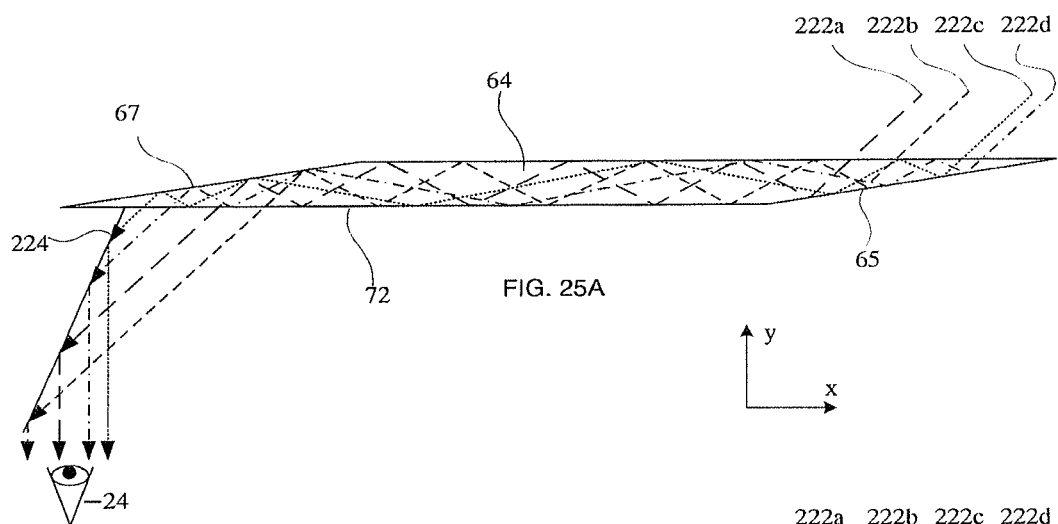
Figure 25B:
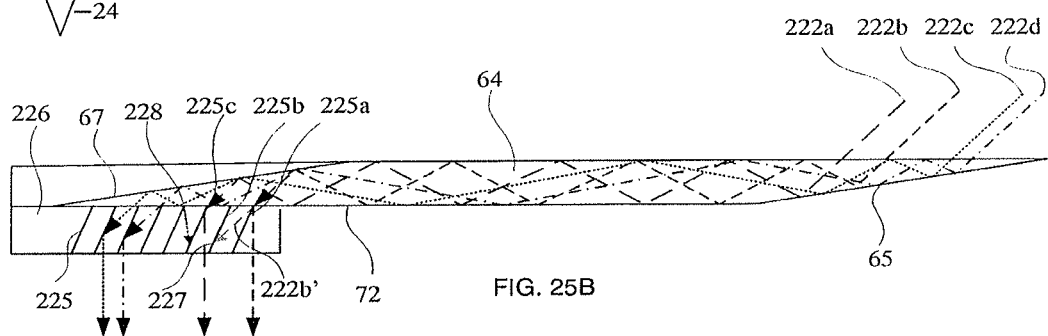
Figure 25C:
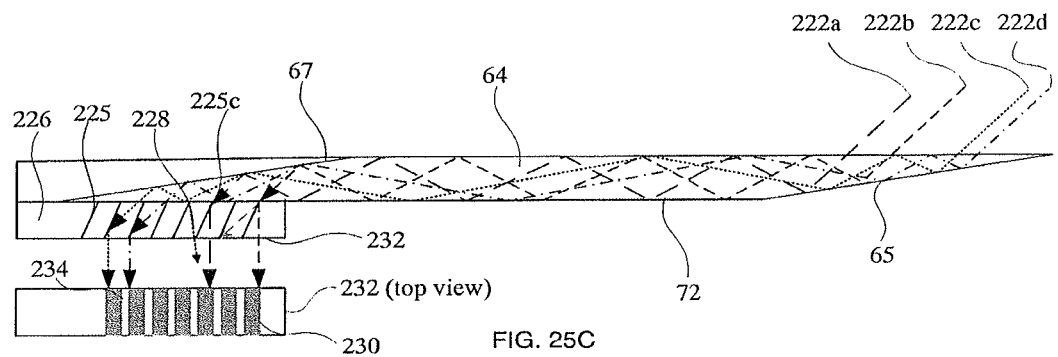
Figure 26:
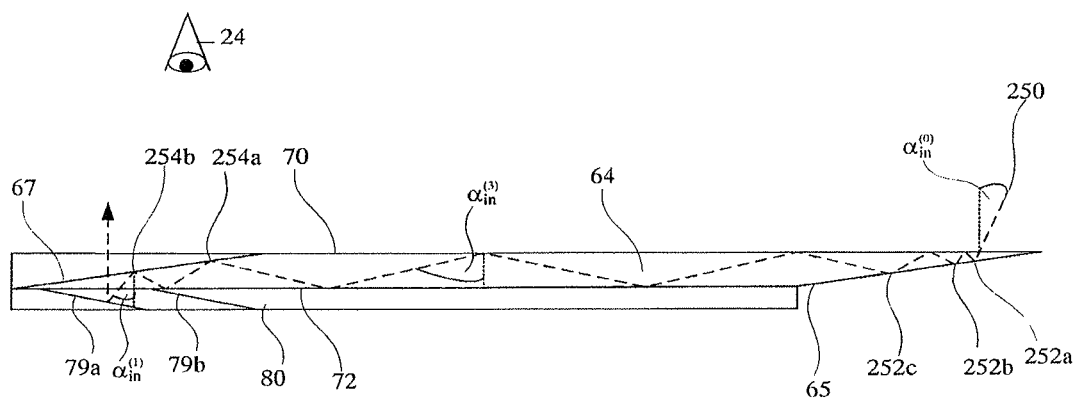
Figure 27:
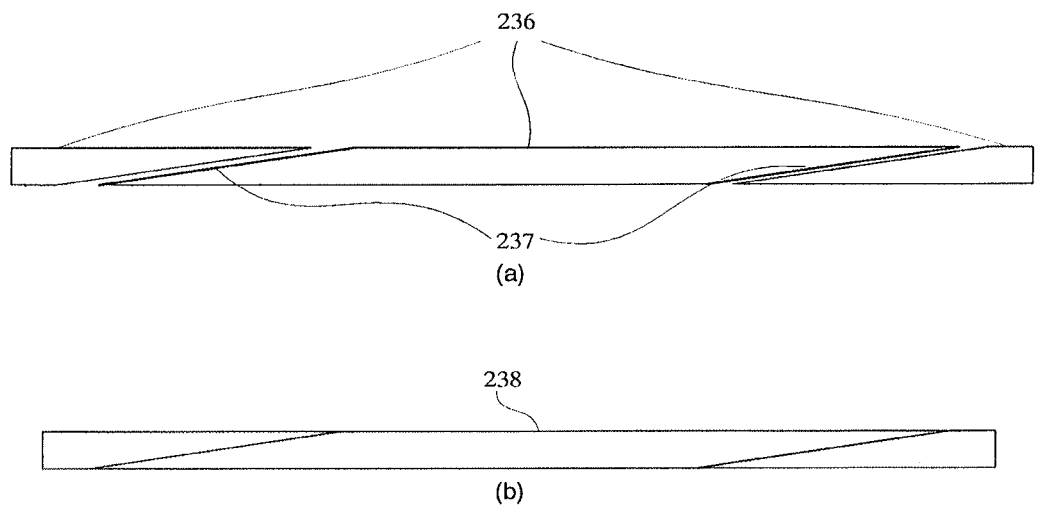
Figure 28A:
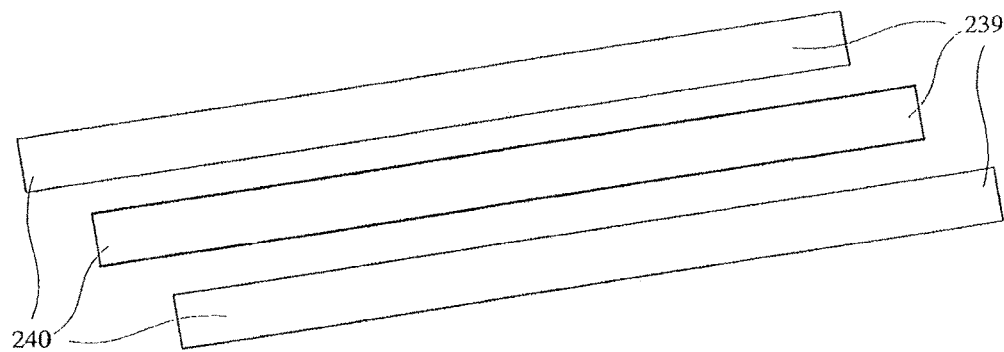
Figure 28B:
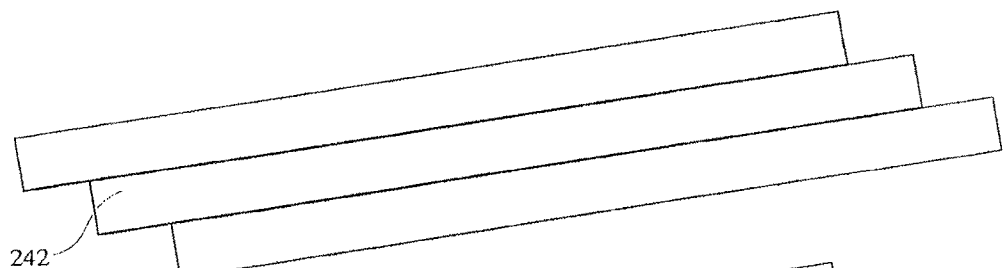
Figure 28C:
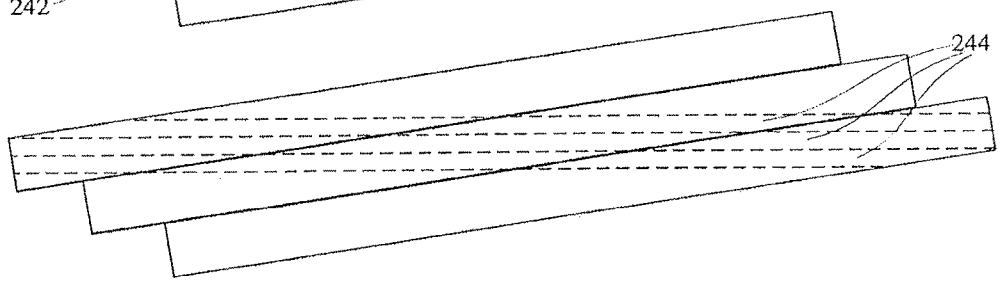
Figure 28D:
Figure 28E:
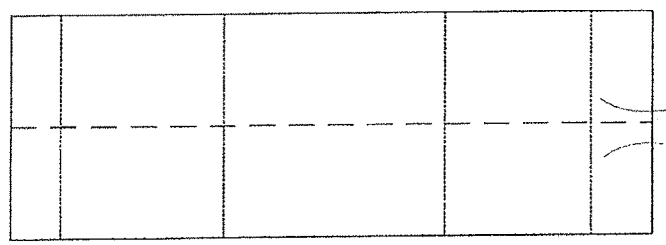

FIGS. 12A, 12B, 12C and 12D are schematic sectional-views of optical devices in which an angular sensitive reflecting surface is embedded inside the transparent substrate, according to the present invention;

FIG. 13 is a graph illustrating the reflection of the incident light waves on an angular sensitive reflecting surface as a function of the incident angle, according to the present invention;

FIG. 14 is another graph illustrating the reflection of the incident light waves on an angular sensitive reflecting surface as a function of the incident angle, according to the present invention;

FIGS. 15A and 15B schematically illustrate various ways to couple light waves into the transparent substrate using a transparent prism attached to one of the external surfaces of the substrate, according to the present invention;

FIGS. 16A, 16B and 16C schematically illustrate various ways to mix the coupled light waves inside the substrate by optically cementing a thin transparent plate to one of the major surfaces of the substrate, according to the present invention;

FIG. 17 is a graph illustrating the reflection of incident light waves on an interface plane between a thin transparent plate and a major surface of the substrate as a function of the incident angle, according to the present invention;

FIGS. 18A, 18B and 18C are schematic sectional-views of optical devices in which two different transparent substrates are optically attached together and one of the coupling-in elements is an angular sensitive reflecting surface, according to the present invention;

FIG. 19 schematically illustrates the active parts of the coupling-out surface according to the viewing angle and the eye-motion-box of the system;

FIGS. 20A, 20B, and 20C are schematic sectional-views of optical devices in which four different transparent substrates are optically attached and two of the coupling-in elements are angular sensitive reflecting surfaces, according to the present invention;

FIGS. 21A and 21B are graphs illustrating the reflection of incident light waves on two different angular sensitive coupling-in surfaces as a function of the incident angle according to the present invention;

FIG. 22 schematically illustrates active parts of a coupling-out surface according to the viewing angle and the eye-motion-box of the system, wherein at least part of the coupling-in elements are angular sensitive reflecting surfaces;

FIGS. 23A, 23B and 23C are schematic sectional-views of optical devices in which a reflecting surface is embedded inside the transparent substrate and the output aperture of the system is expanded, according to the present invention;

FIG. 24 is a graph illustrating the reflection of incident light waves on a partially reflecting surface as a function of an incident angle, according to the present invention;

FIGS. 25A, 25B and 25C are other schematic sectional-views of folding reflecting surfaces which re-direct the coupled-out light waves into the viewer's eye, according to the present invention;

FIG. 26 is a diagram illustrating exploiting more than two propagation orders of the coupled light waves inside the substrate, according to the present invention;

FIG. 27 is a diagram illustrating a method for fabricating the required transparent substrate according to the present invention, and FIGS. 28A, 28B, 28C, 28D and 28E are diagrams illustrating a method for fabricating a transparent substrate, according to the present invention.

DETAILED DESCRIPTION OF PREFERRED EMBODIMENTS

Figure 1:
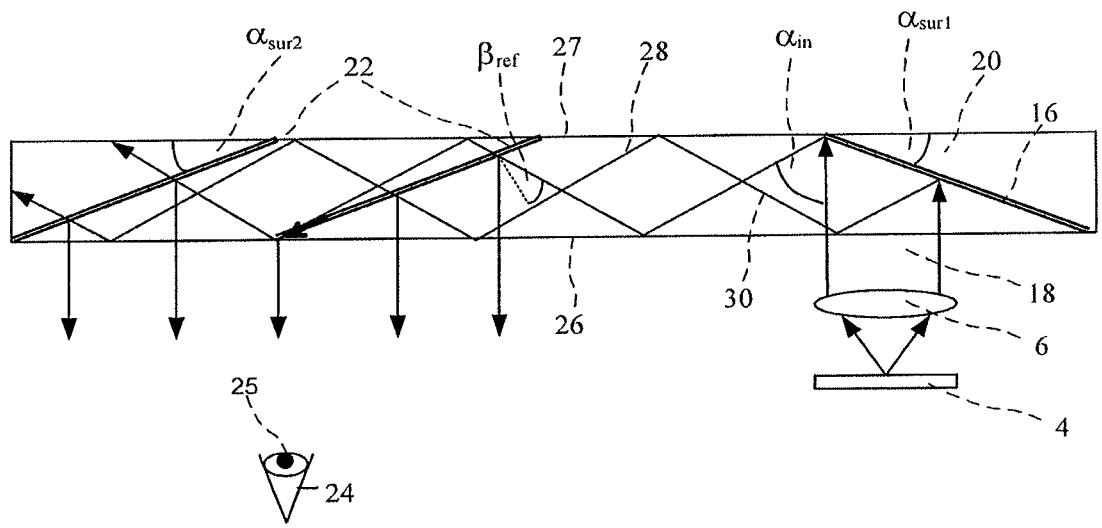

FIG. 1 illustrates a sectional view of a prior art light-guide optical element. The first reflecting surface 16 is illuminated by a plane light wave 18 emanating from a display source 4 and collimated by a lens 6, located behind the device. The reflecting surface 16 reflects the incident light from the source, such that the light is trapped inside a planar substrate 20 by total internal reflection. After several reflections off the major surfaces 26, 27 of the substrate, the trapped light waves reach an array of partially reflecting surfaces 22, which couple the light out of the substrate into an eye 24, having a pupil 25, of a viewer. Assuming that the central light wave of the source is coupled out of the substrate 20 in a direction normal to the substrate surface 26, the partially reflecting surfaces 22 are flat, and the off-axis angle of the coupled light wave inside the substrate 20 is $\alpha_{in}$, then the angle $\alpha_{sur2}$ between the reflecting surfaces and the major surfaces of the substrate is:

$$\alpha_{sur2} = \frac{\alpha_{in}}{2}. \tag{1}$$

As can be seen in FIG. 1, the trapped rays arrive at the reflecting surfaces from two distinct directions 28, 30. In this particular embodiment, the trapped rays arrive at the partially reflecting surface 22 from one of these directions 28 after an even number of reflections from the substrate major surfaces 26 and 27, wherein the incident angle $\beta_{ref}$ between the trapped ray and the normal to the reflecting surface is:

$$\beta_{ref} = \alpha_{in} - \alpha_{sur2} = \frac{\alpha_{in}}{2}. \quad (2)$$

The trapped rays arrive at the partially reflecting surface 22 from the second direction 30 after an odd number of reflections from the substrate surfaces 26 and 27, where the off-axis angle is $\alpha'_{in} = -\alpha_{in}$ and the incident angle between the trapped ray and the normal to the reflecting surface is:

$$\beta'_{ref} = \alpha'_{in} - \alpha_{sur2} = -\alpha_{in} - \alpha_{sur2} = -\frac{3\alpha_{in}}{2}, \quad (3)$$

where, the minus sign denotes that the trapped ray impinges on the other side of the partially reflecting surface 22. As further illustrated in FIG. 1, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

Figure 2A:
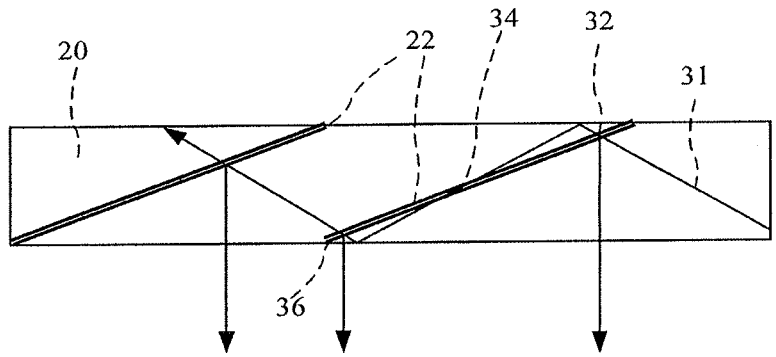
Figure 2B:
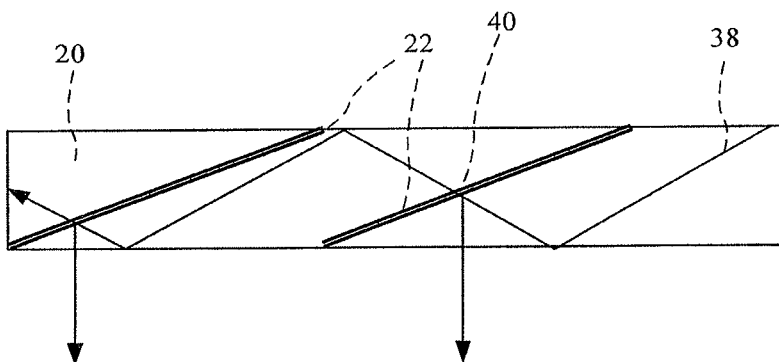

An important issue to be considered is the actual active area of each reflecting surface. A potential non-uniformity in the resulting image might occur due to the different reflection sequences of different rays that reach each selectively reflecting surface: some rays arrive without previous interaction with a selectively reflecting surface and other rays arrive after one or more partial reflections. This effect is illustrated in FIG. 2A. Assuming that for example $\alpha_{in}=50°$, the ray 31 intersects the first partially reflecting surface 22 at the point 32. The incident angle of the ray is 25° and a portion of the ray's energy is coupled out of the substrate. The ray then intersects the same partially reflecting surface at point 34 at an incident angle of 75°, without a noticeable reflection, and then intersects again at point 36 with an incident angle of 25°, where another portion of the energy of the ray is coupled out of the substrate. In contrast, the ray 38 shown in FIG. 2B undergoes only one reflection 40 from the same surface. Further multiple reflections occur at other partially reflecting surfaces.

Figure 3:
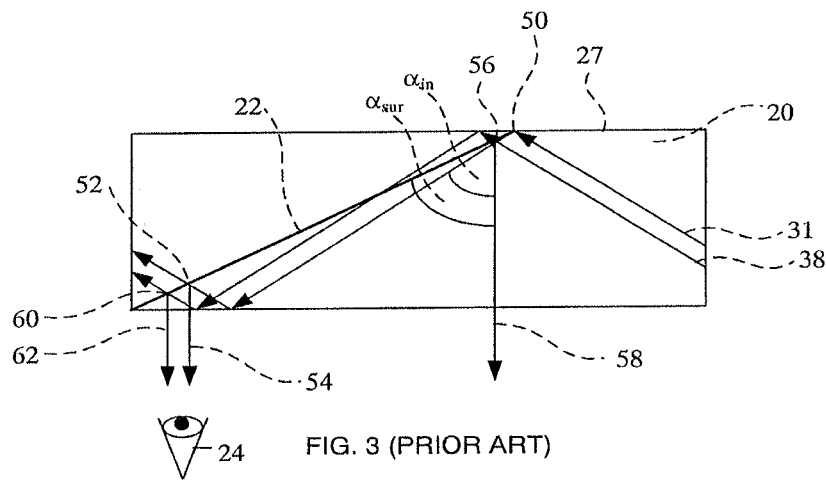

FIG. 3 illustrates this non-uniformity phenomenon with a detailed sectional view of the partially reflective surface 22, which couples light trapped inside the substrate out and into the eye 24 of a viewer. As can be seen, the ray 31 is reflected off the upper surface 27, next to the line 50, which is the intersection of the reflecting surface 22 with the upper surface 27. Since this ray does not impinge on the reflecting surface 22, its brightness remains the same and its first incidence at surface 22 is at the point 52, after double reflection from both external surfaces. At this point, the light wave is partially reflected and the ray 54 is coupled out of the substrate. For other rays, such as ray 38, which is located just below ray 31, the first incidence at surface 22 is at point 56, before it meets the upper surface 27, wherein the light wave is partially reflected and the ray 58 is coupled out of the substrate. Hence, when it impinges on surface 22 at point 60, following double reflection from the external surfaces 26, 27, the brightness of the coupled-out ray is lower than the adjacent ray 54. As a result, all the coupled-out light rays with the same coupled-in angle as 31 that arrive at surface 22 left of the point 52, have a lower brightness. Consequently, the reflectance from surface 22 is actually "darker" left of the point 52 for this particular couple-in angle.

It is difficult to fully compensate for such differences in multiple-intersection effects. Nevertheless, in practice, the human eye tolerates significant variations in brightness, which remains unnoticed. For near-to-eye displays, the eye integrates the light which emerges from a single viewing angle and focuses it onto one point on the retina, and since the response curve of the eye is logarithmic, small variations, if any, in the brightness of the display will not be noticeable. Therefore, even for moderate levels of illumination uniformity within the display, the human eye experiences a high-quality image. The required moderate uniformity can readily be achieved with the element illustrated in FIG. 1. For systems having large FOVs, and where a large EMB is required, a comparatively large number of partially reflecting surfaces is needed to achieve the desired output aperture. As a result, the non-uniformity due to the multiple intersections with the large number of partially reflecting surfaces becomes more dominant, especially for displays located at a distance from the eye, such as HUDs, and the non-uniformity cannot be tolerated. For these cases, a more systematic method for overcoming the non-uniformity is required.

Since the "darker" portions of the partially reflecting surfaces 22 contribute less to the coupling of the trapped light waves out of the substrate, their impact on the optical performance of the substrate can be only negative, namely, there will be darker portions in the output aperture of the system and dark stripes will exist in the image. The transparency of each one of the reflecting surfaces is, however, uniform with respect to the light waves from the external scene. Therefore, if overlapping is set between the partially reflective surfaces to compensate for the darker portions in the output aperture, then rays from the output scene that cross these overlapped areas will suffer from double attenuations and darker stripes will be created in the external scene. This phenomenon significantly reduces the performance not only of displays which are located at a distance from the eye, such as head-up displays, but also that of near-eye displays, and hence, it cannot be utilized.

Figure 4A:
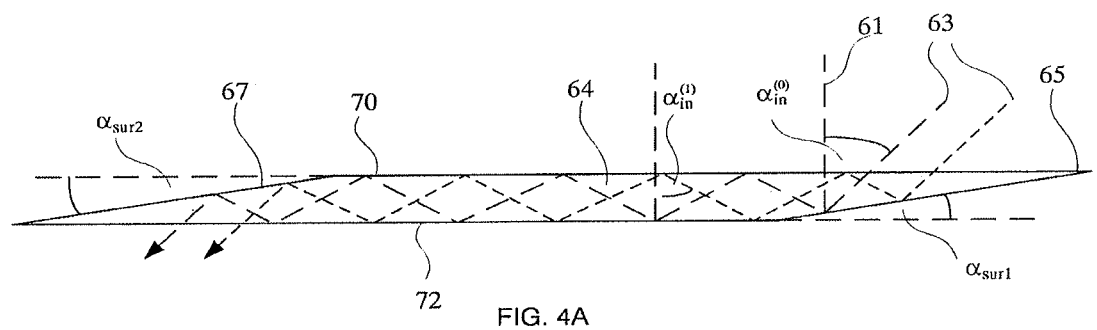
Figure 4B:
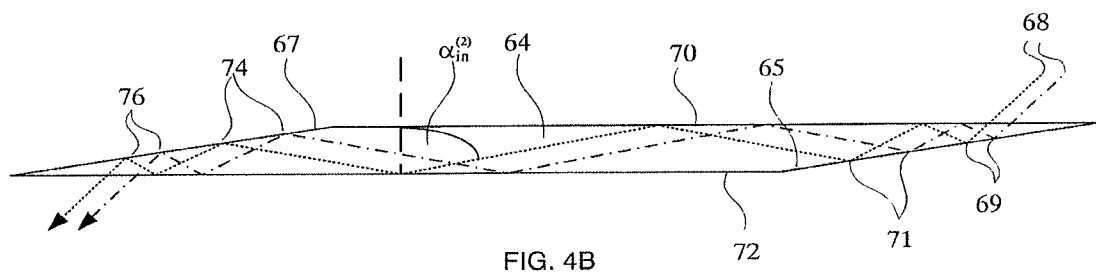

FIGS. 4A and 4B illustrate embodiments for overcoming the above-described problem, according to the present invention. Instead of partially overcoming the undesired secondary reflections from the partially reflecting surfaces, these reflections are utilized to expand the output aperture of the optical system. As illustrated in FIG. 4A, two rays 63 from a plane light waves emanating from a display source and collimated by a lens (not shown) enter a light transparent substrate 64, having two parallel major surfaces 70 and 72, at an incident angle of $\alpha_{in}^{(0)}$ in respect to axis 61, which is normal to the major surfaces 70, 72 of the substrate. The rays impinge on the reflecting surface 65 which is inclined at an angle $\alpha_{sur1}$ to the major surfaces of the substrate. The reflecting surface 65 reflects the incident light rays such that the light rays are trapped inside a planar substrate 64 by total internal reflection from the $\alpha_{in}^{(1)}$ or surfaces. The off-axis angle $\alpha_{in}^{(1)}$ between the trapped ray and the normal to the major surfaces 70, 72 is $$\alpha_{in}^{(1)} = \alpha_{in}^{(0)} + 2 \cdot \alpha_{sur1}. \quad (4)$$

After several reflections off the surfaces of the substrate, the trapped light rays reach a second flat reflecting surface 67, which couples the light rays out of the substrate. Assuming that surface 67 is inclined at the same angle to the major surfaces as the first surface 65, that is to say, surfaces 65 and 67 are parallel and $\alpha_{sur2}=\alpha_{sur1}$, then the angle $\alpha_{out}$ between the coupled out rays and the normal to the substrate plane is $$\alpha_{out}=\alpha_{in}^{(1)}-2\cdot\alpha_{sur2}=\alpha_{in}^{(1)}-2\cdot\alpha_{sur1}=\alpha_{in}^{(0)}. \quad (5)$$

That is to say, the coupled-out light rays are inclined to the substrate at the same angle as the incident light rays. So far, the coupled-in light waves behave similar to the light waves illustrated in the prior art of FIG. 1. FIG. 4B, however, illustrates, a different behavior wherein two light rays 68, having the same incident angle of $\alpha_{in}^{(0)}$ as rays 63, impinge on points 69 which are located at the right side of the reflecting surface 65. After a first reflection from surfaces 65, when the coupled light rays are trapped inside the substrate at an off-axis angle of $\alpha_{in}^{(1)}$, the light rays are reflected from the upper major surface 70, and impinge again on points 71 at surface 65. The light rays are reflected again from surface 65 and the off-axis angle of the trapped rays inside the substrate is now $$\alpha_{in}^{(2)}=\alpha_{in}^{(1)}+2\cdot\alpha_{sur1}=\alpha_{in}^{(0)}+4\cdot\alpha_{sur1}. \quad (6)$$

After several reflections off the surfaces of the substrate, the trapped light rays reach the second reflecting surface 67. The light rays 68 first impinge on points 74 which are located at the right side (which is practically an active side) of the reflecting surface 67. After a first reflection from surfaces 67, when the coupled light rays are still trapped inside the substrate at an off-axis angle of $\alpha_{in}^{(1)}$, the light rays are reflected from the lower major surface 72 and impinge again on points 76 located at the right side of the reflecting surface 67. The light rays are then reflected again, and the off-axis angle of the light rays is now:

$$\alpha_{out}=\alpha_{in}^{(2)}-4\cdot\alpha_{sur1}=\alpha_{in}^{(1)}-2\cdot\alpha_{sur1}==\alpha_{in}^{(0)}. \quad (7)$$

That is to say, the light rays 68, which are reflected twice from the coupling-in reflecting surface 65, as well as from the active side of the coupling-out surface 67, are coupled out from the substrate at the same off-axis angle $\alpha_{out}$ as the other two rays 63 which are reflected only once from surfaced 65 and 67, which is also the same incident input angle of these four rays on the substrate major planes.

As illustrated in FIGS. 4A and 4B, the optical element 64 of the present invention is differentiated even from the prior art element 20 illustrated in FIGS. 1-3 by some prominent characteristics: first of all, different rays emanating from the same input light waves (such as rays 63 and 68 in FIGS. 4A and 4B) propagate inside the substrate having different off-axis angles ($\alpha_{in}^{(1)}$ and $\alpha_{in}^{(2)}$, respectively). In addition, some of the trapped light rays impinge on the same side of the coupling-out reflecting surface with two different incident angles and have to be reflected at least twice from this surface in order to be coupled out from the substrate. As a result, proper notation rules must be defined in order to correctly note the various parameters of the trapped light rays inside the substrate. For simplicity, from here on in, the refraction of the coupling-in or coupling-out light rays due to second Snell Law while entering or exiting the substrate is neglected, and it is assumed that the materials of the optical elements which are located next to the substrate's surfaces, are similar to that of the substrate. The element should be separated by an air gap or by an adhesive having lower refractive index, in order to enable the total internal reflection of the trapped rays inside the substrate. In any case, only the directions of the rays inside the substrate are considered. In order to differentiate between the various "propagation orders" of the trapped light waves, a super-script (i) will denote the order i. The input light waves which impinge on the substrate in the zero order are denoted by the superscript (0). After each reflection from the coupling-in reflecting surface the order of the trapped ray is increased by one from (i) to (i+1) where $$\alpha_{in}^{(i+1)}=\alpha_{in}^{(i)}+2\cdot\alpha_{sur1}. \quad (8)$$

Similarly, after each reflection from the coupling-out reflecting surface the order of the trapped ray is decreased by one from (i) to (i−1) where $$\alpha_{in}^{(i-1)}=\alpha_{in}^{(1)}-2\cdot\alpha_{sur2}. \quad (9)$$

The angular spectrum of light waves which are located in a given order are confined by the two extreme angles of these order, that is:

$$\alpha_{in}^{(i)}(\min)<\alpha_{in}^{(i)}<\alpha_{in}^{(i)}(\max), \quad (10)$$

where, $\alpha_{in}^{(i)}(\min)$ and $\alpha_{in}^{(i)}(\max)$ are the minimal and the maximal angles of the order (i), respectively. The direction of the central light wave of the image is:

$$\alpha_{in}^{(i)}(cen) = \frac{\alpha_{in}^{(i)}(\max) + \alpha_{in}^{(i)}(\min)}{2}, \quad (11)$$

The FOV of the image inside the substrate is:

$$FOV=\alpha_{in}^{(i)}(\max)-\alpha_{in}^{(i)}(\min), \quad (12)$$

The FOV inside the substrate does not depend on the order (i). The entire angular spectrum of the light waves which are located in a given order (i) are denoted by $$F^{(i)}=\{\alpha_{in}^{(i)}(\min),\alpha_{in}^{(i)}(\max)\}, \quad (13)$$

where $$F^{(i+1)}=F^{(i)}+2\cdot\alpha_{sur1}. \quad (14)$$

The incident angles of the light rays on the coupling-in and coupling-out reflecting surfaces are also can be denotes as $\alpha_{si}^{(i)}$ and $\alpha_{so}^{(i)}$, respectively, where $$\alpha_{si}^{(i)}=\alpha_{in}^{(i)}+\alpha_{sur1} \quad (15)$$

and $$\alpha_{so}^{(i)}=\alpha_{in}^{(i)}-\alpha_{sur2}. \quad (16)$$

It is apparent from Eqs. (5) and (7) that in order for the output direction of different rays which undergo different number of reflections from the reflecting surfaces to be the to same, the two reflecting surfaces should be strictly parallel to each other. In addition, any deviation between the incident angles of the trapped light rays on the two major surfaces will cause, at each reflecting cycle, a drift in the off-axis angle $\alpha_{in}^{(i)}$. Since the trapped light rays from the higher order undergo a much smaller number of reflections from the major surfaces of the substrate than those from the lower order, the drift of the low order will be much more noticeable than that of the high order. As a result, it is required that the parallelism between the major surfaces of the substrate will be achieved to a high degree.

In order that the light waves will be coupled into the substrate 64 by total internal reflection, it is necessary that for the entire FOV of the image the off-axis angle inside the substrate will fulfill the equation $$\alpha_{in}^{(1)}>\alpha_{cr}, \quad (17)$$

where, $\alpha_{cr}$ is the critical angle for total internal reflection inside the substrate. On the other hand, in order for the light waves to be coupled out from the substrate, it is necessary that the entire FOV of the image the off-axis angle of the output light waves will fulfill the equation:

$$\alpha_{in}^{(0)} < \alpha_{cr}. \quad (18)$$

Combining Eqs. (9), (11), (12) and (17) yields $$\alpha_{in}^{(0)}(cen) = \alpha_{in}^{(1)}(\min) + \frac{FOV}{2} - 2 \cdot \alpha_{sur2} > \alpha_{cr} + \frac{FOV}{2} - 2 \cdot \alpha_{sur2}. \quad (19)$$

In order for the entire first two orders to be coupled inside the substrate the condition $$\alpha_{in}^{(2)}(\max) < 90° - \alpha_{sur2} \quad (20)$$

must be fulfilled. In addition, even for material having an extremely high refractive index, and even where the external media which is adjacent to major surfaces of the substrate is air, the critical angle is limited by $$\alpha_{cr} > 32°. \quad (21)$$

Combining Eqs. (9), (12), (18), (20) and (21) yields $$3\alpha_{sur2} < 90° - FOV - \alpha_{cr}, \quad (22)$$

which yields, even for moderate FOV of 10° inside the substrate, the limitation of:

$$\alpha_{sur2} < 16° \quad (23)$$

Combining Eqs. (19), (21) and (23) yields, the limitation of:

$$\alpha_{in}^{(0)}(cen) > 5° \Rightarrow \alpha_{out}^{(0)}(cen) > 9°, \quad (24)$$

wherein, $\alpha_{out}^{(0)}(cen)$ is the inclined output angle in the air, namely, the coupled-out image is substantially inclined in relation to the normal to the substrate plane. For wider FOVs and smaller $\alpha_{sur2}$, the inclination angle will be increased. Usually however, it is required that the coupled-out image, which is projected to the viewer's eye, will be oriented substantially normal to the substrate plane.

Figure 5A:
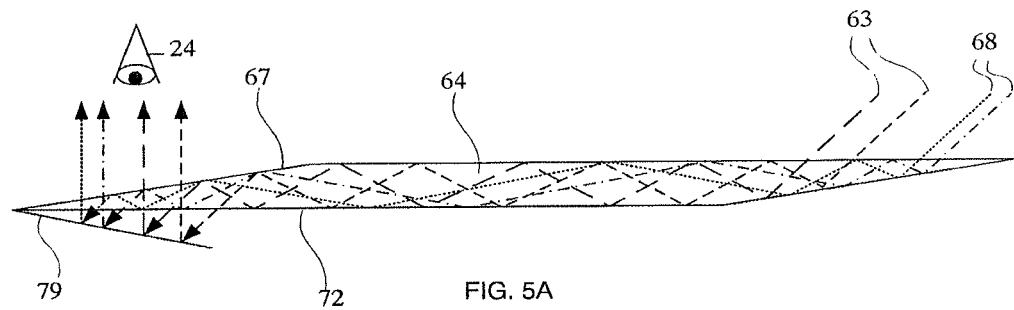
Figure 5B:
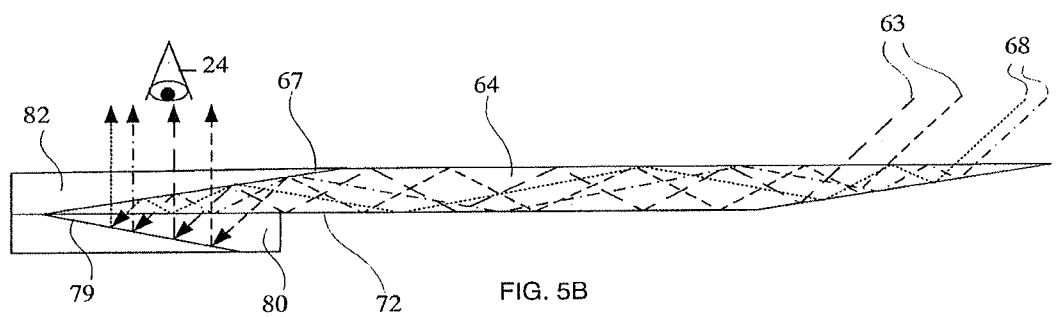
Figure 5C:
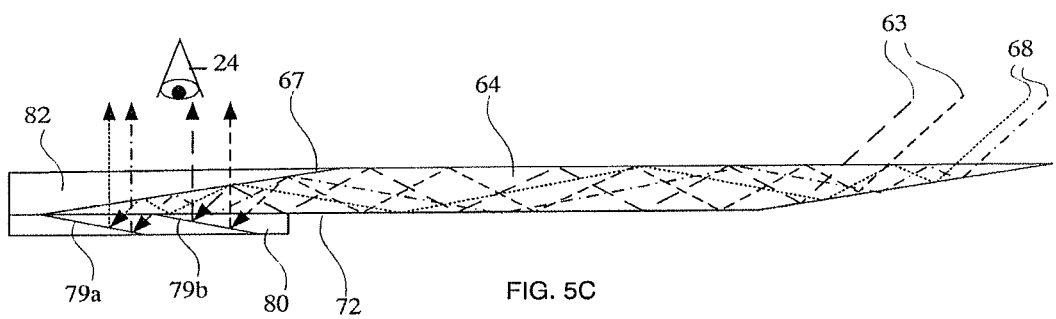

As illustrated in FIG. 5A, the inclination of the image can be adjusted by adding a partially reflecting surface 79 which is inclined at an angle of $$\frac{\alpha_{in}^{(0)}(cen)}{2}$$

to the surface 72 of the substrate. As shown, the image is reflected and rotated such that it passes again through the substrate substantially normal to the substrate major surfaces. As illustrated in FIG. 5B, in order to minimize distortion and chromatic aberrations, it is preferred to embed surface 79 in a prism 80, and to complete the shape of the substrate 64 with a second prism 82, both of them fabricated of a material similar to that of the substrate. In order to minimize the thickness of the system it is possible, as illustrated in FIG. 5C, to replace the single reflecting surface 80 with as array of parallel partially reflecting surfaces 79a, 79b, etc., where the number of the partially reflecting surfaces can be determined according to the requirements of the system.

Figure 5D:
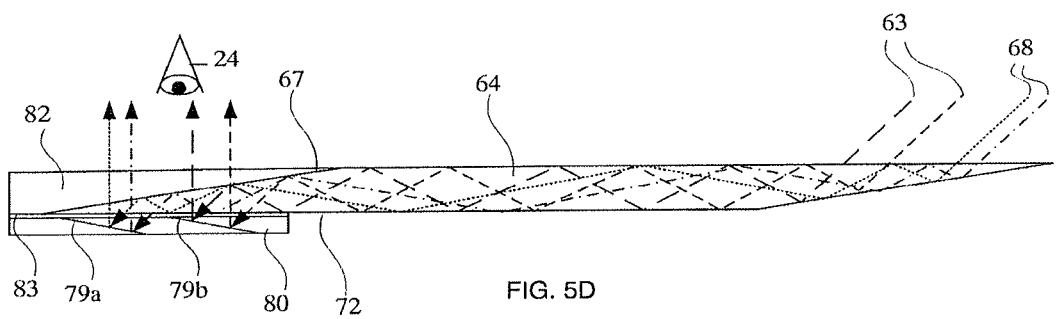

There are two contradicting requirements from the interface plane 83 (FIG. 5D) between the substrate 64 and the prism 80. On the one hand, the first order image $F^{(1)}$ should be reflected from that plane, while the zero order image $F^{(0)}$ should substantially pass through it, after being reflected from surface 67, with no significant reflections. In addition, as illustrated in FIGS. 5A-5C, after being reflected from surface 79, the optical wave passes again through the interface plane 83 and here also it is required that the undesired reflections will be minimized. A possible way to achieve it this, as illustrated in FIG. 5D, is to use an air gap in the interface plane 83. It is preferred, however, in order to achieve a rigid system, to apply an optical adhesive in the interface plane 83, in order to cement the prism 80 with the substrate 64. This approach is illustrated hereby with an optical system having the following parameters:

$$\alpha_{sur1} = \alpha_{sur2} = 10°; F^{(0)} = \{30°, 40°\}; F^{(1)} = \{50°, 60°\}$$

$$F^{(2)} = \{70°, 80°\}. \quad (25)$$

The light waves are s-polarized. The optical material of the substrate 64 and the prisms 80 and 82 is Schott N-SF57 having a refractive index of $n_d=1.8467$, and the optical adhesive is NOA 1315, having a refractive index of $n_d=1.315$. The critical angle is therefore $\alpha_{cr} > 45.4°$. All the optical rays in the higher orders $F^{(1)}$ and $F^{(2)}$ have off-axis angles higher than the critical angle, and therefore, they are totally reflected from the interface plane 83. All the optical rays in the zero order impinge on the interface plane at an incident angle lower than the critical angle, and hence, they pass through it. To minimize the Fresnel reflections of the coupled-out light waves from the interface plane, however, it is preferred to apply a suitable anti-reflective (AR) coating to this plane.

Figure 6:
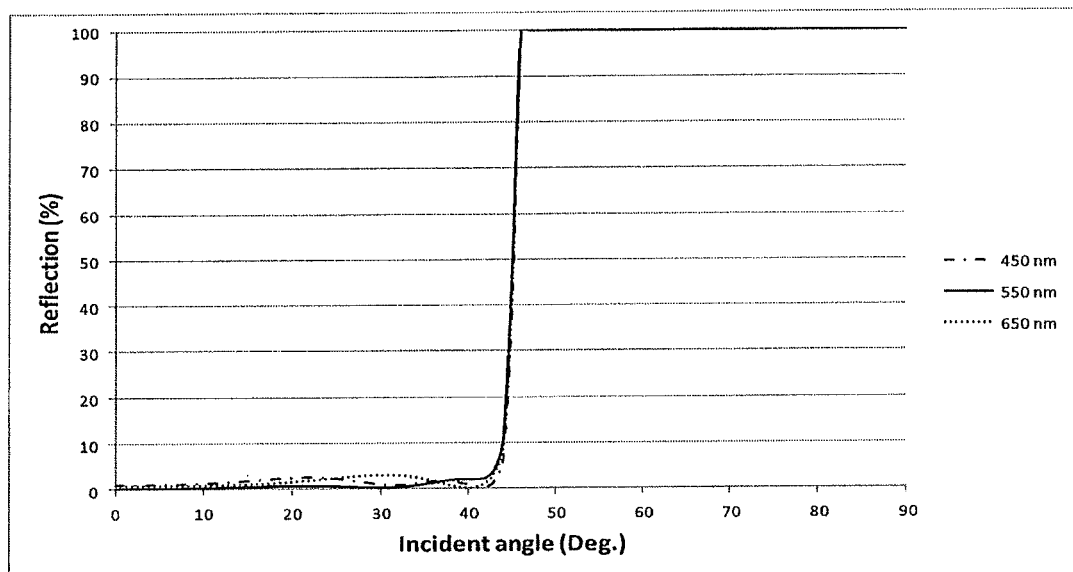

FIG. 6 illustrates the graph of the reflection from the interface plane coated with an appropriate AR coating as a function of the incident angle for three different wavelengths: 450 nm, 550 nm and 650 nm, which practically cover the relevant photopic region. As shown, the reflection is 100% for the angular spectrum above 45°, while it is below 3% for the incident angles {30°, 40°} of the zero order, as well as for the light waves which pass again substantially normal to the plane 83 after being reflected from surface 79.

Another requirement is that surface 67 will be reflective for the incident angles of the higher orders $\alpha_{so}^{(1)}$ and $\alpha_{so}^{(2)}$, as well as transparent for the coupled-out light waves which pass through this plane after being coupled out from the substrate, reflected by surface 79, and pass again through the interface plane 83. That is, for the exemplified system given above, the surface should be reflective for incident angles above 40° and substantially transparent for incident angles below 15°. Here also an air gap between surface 67 and prism 82 is a possible solution, but here again it is preferred to cement the element together with an optical adhesive. The requirements from the dielectric coating that should be applied to the surface 67 is therefore to be reflective for the incident angles of $40° < \alpha_{so}^{(1)} < 45°$ (above 45° the light rays are totally reflected from the surface), and substantially transparent for the incident angles below 15°.

Figure 7:
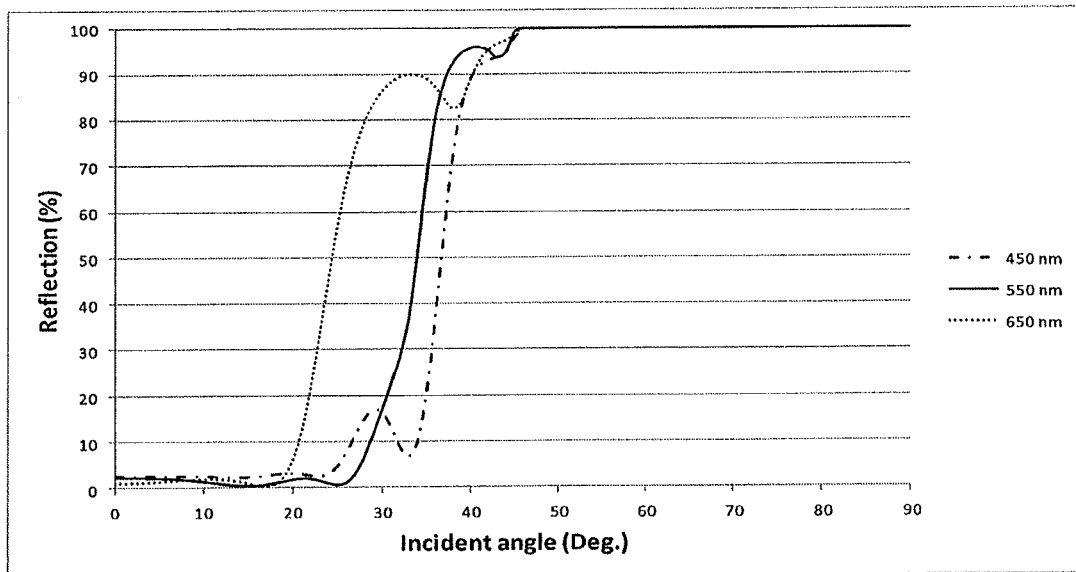

FIG. 7 illustrates the graph of the reflection from the interface plane coated with an appropriate angular sensitive coating as a function of the incident angle for three different wavelengths: 450 nm, 550 nm and 650 nm. As shown, the reflection is higher than 93% for the angular spectrum between 40° and 45°, while it is below 2% for the incident angles below 15° as required.

Concerning the reflectance of surface 79, this parameter depends on the nature of the optical system. In non-see-through systems, such as virtual-reality displays, the substrate can be opaque, and the transmittance of the system has no importance. In that case, it is possible to apply a simple highly reflecting coating, either metallic or dielectric, on the surface. In that case, since on the one hand the reflection of surfaces 65 and 79 is very high for the impinging light waves and on the other hand the reflection of surfaces 67 and 83 is very high for the light waves that should be reflected from them and very low for light waves that should be transmitted through them, the total efficiency of the optical system can be high. In see-through systems, such as EIMDs for military or professional applications, or for augmented reality systems, wherein the viewer should see the external scene through the substrate, surface 79 should be at least partially transparent. As a result, in such a case a partially reflecting coating should be applied to surface 79. The exact ratio between the transmission and the reflection of the coating should be determined according to the various requirements of the optical system. In the event that an array of partially reflecting surfaces 79a, 79b . . . is used to reflect the light waves to a viewer's eye, the reflectance of the coating should be the same for all the partially reflecting surfaces in order to project a uniform image to the viewer's eye as well as to transmit a uniform external seen.

Figure 8A:
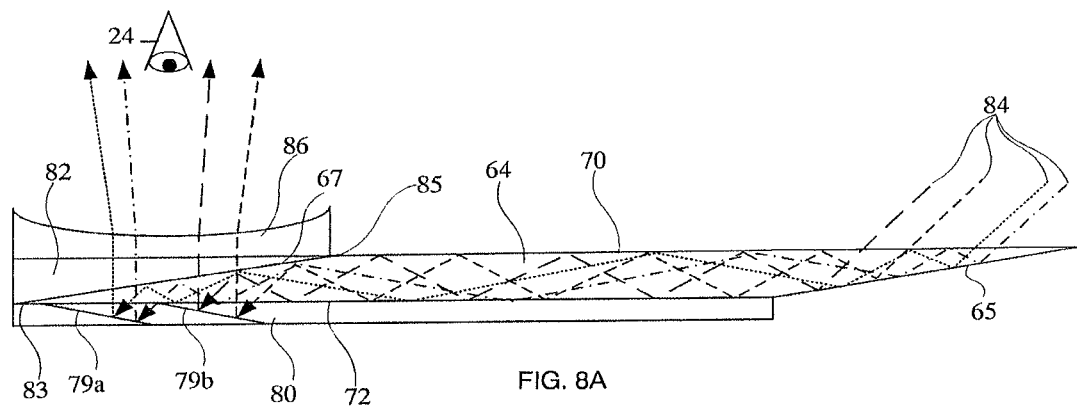
Figure 8B:
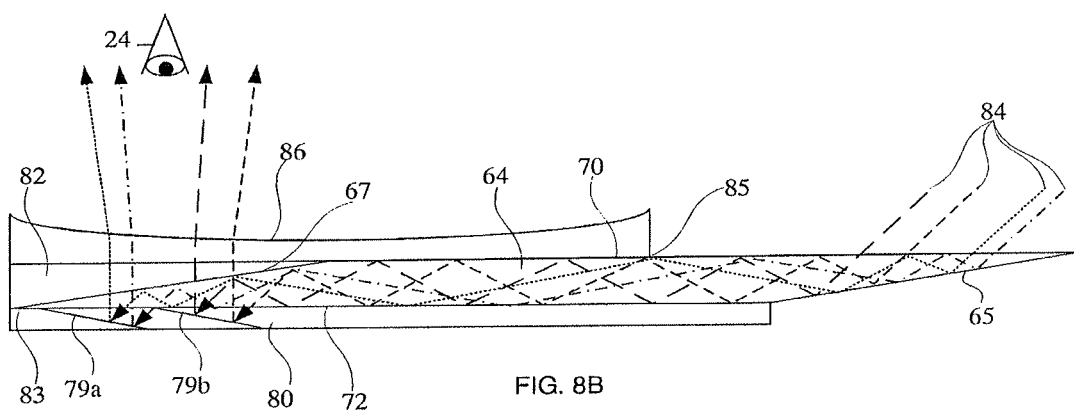

In all of the embodiments of the invention described hereinabove, the image transmitted by the substrate is focused to infinity. However, there are applications or uses where the transmitted image should be focused to a closer distance, for example, for people who suffer from myopia and cannot properly see images located at long distances. FIG. 8A illustrates an embodiment for implementing a lens, based on the present invention. A collimated image 84 is coupled into the substrate 64 by the reflecting surface 65, reflected (once or twice, depending on the order of the coupled rays) by the angular selective reflecting surface 67, passes through the interface plane 83, is partially reflected by the array of partially reflecting surfaces 79a, 79b, and passes again through surface 83 into the eye 24 of a viewer. The ophthalmic plano-concave lens 86, which is attached to the upper surface 70 of the substrate, focuses the images to a convenient distance, and optionally corrects other aberrations of the viewer's eye, including astigmatism. Since the lens 86 is attached to prism 82, which is not active in the mechanism for trapping of the optical waves inside the substrate 64 by total internal reflection, a simple cementing procedure can be used to optically attach the lens 86 to prism 82. There are applications, however, such as illustrated in FIG. 8B, where the lens 86 should have an extended aperture, and hence, it should also be attached to the upper surface 70 of the substrate. Here, since this surface is active in trapping the light waves inside the substrate, an isolation layer should be provided in the interface plane 85 between the lens and the substrate, to ensure the trapping of the image rays inside the substrate by a total internal reflection. A possible way to achieve this is to use an air gap in the interface plane 85. It is preferred, however, as explained above, to apply an optical adhesive in the interface plane, in order to cement the prism 82 with the lens 86. As illustrated above in relation to FIG. 6, an appropriate AR coating can be applied to the interface plane 85, in order to minimize the Fresnel reflections from this plane.

Figure 8C:
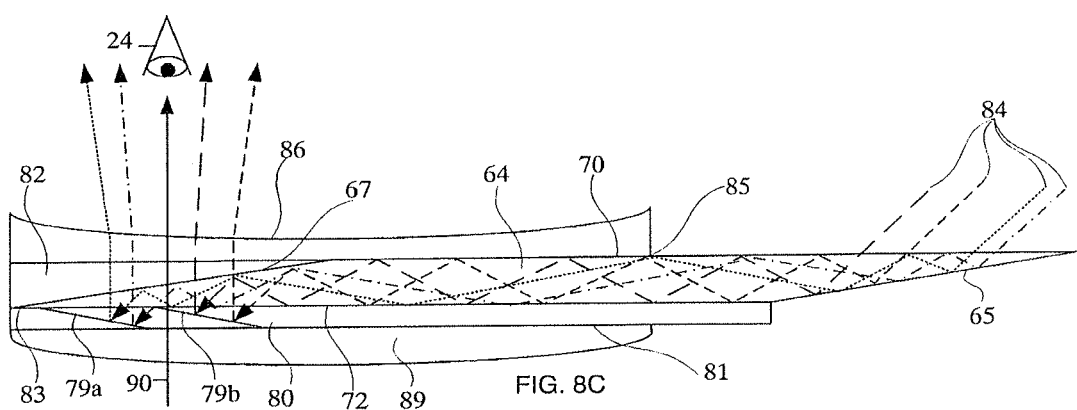

In all of the embodiments of the invention described above, it is assumed that the external scene is located at infinity. There are however applications, such as for professional or medical staff, where the external scene is located at closer distances. FIG. 8C illustrates a system for implementing a dual lens configuration, based on the present invention. A collimated image 84 is coupled into the substrate 64 by the reflecting surface 65, reflected by the angular selective reflecting surface 67, passes through the interface plane 83, is partially reflected by the array of partially reflecting surfaces 79a, 79b . . . and passes again through surface 83 into the eye 24 of a viewer. Another scene image 90 from a close distance is collimated to infinity by a lens 89, and then passed through the substrate 64 into the eye. The lens 86 focuses the images 84 and 90 to a convenient distance, usually the original distance of the external scene 90, and corrects other aberrations of the viewer's eye, if required. Since the lower surface 81 of prism 80 is not active with regard to the optical waves that are coupled inside the substrate 64 by total internal reflection and directed by the reflecting surface 79 into the viewer's eye, it is possible to optically attach a prism 80 with a lens 89 using a conventional cementing procedure.

The lenses 86 and 89 plotted in FIGS. 8A-8C are simple plano-concave and plano-convex lenses, respectively. To keep the planar shape of the substrate, it is possible, however, to instead utilize Fresnel lenses, which can be made of thin molded plastic plates with fine steps. Moreover, an alternative way for realizing the lenses 86 or 89, instead of as fixed lenses as described above, is to use electronically controlled dynamic lenses. There are applications where it is required that the user will be able not only to see a non-collimated image, but also to dynamically control the focus of the image. Recently, it has been shown that a high resolution, spatial light modulator (SLM) can be used to form a dynamic focusing element. Presently, the most popular sources for that purpose are LCD devices, but other dynamic SLM devices can be used as well. High resolution, dynamic lenses having several hundred lines/mm are known. This kind of electro-optically controlled lenses can be used as the desired dynamic elements in the present invention, instead of the fixed lenses described above in conjunction with FIGS. 8A-8C. Therefore, the operator can determine and set, in real time, the exact focal planes of both the virtual image projected by the substrate 64 as well as the real image of the external view.

The embodiment of the present invention illustrated in FIGS. 4-8 has several significant advantages as compared to the embodiment of the prior art illustrated in FIGS. 1-3. The main reason for this is that because of the small angle of $\alpha_{sur2}$, the active area of the output aperture of the substrate having a single reflecting surface 67, is much larger than that of a substrate having a single coupling-out partially reflecting surface which is based on the prior art technology. For example, a substrate with a single reflecting surface 67 having an inclination angle of $\alpha_{sur2}=10°$ has an output aperture that will require at least 3-4 facets for a substrate of the prior art technology with a same thickness having an inclination angle of $\alpha_{sur2}\sim30°$. As a result, the fabrication process of the substrate will be much simpler than that of the prior art. In addition, since for many applications only a single facet is needed to achieve the required output aperture, the projected image can be much smoother and with higher optical quality than that of the multi-facet element of the prior art. There are, however, some considerations that should be taken into an account concerning the output and the input apertures of the optical device of the present invention.

Figure 9A:
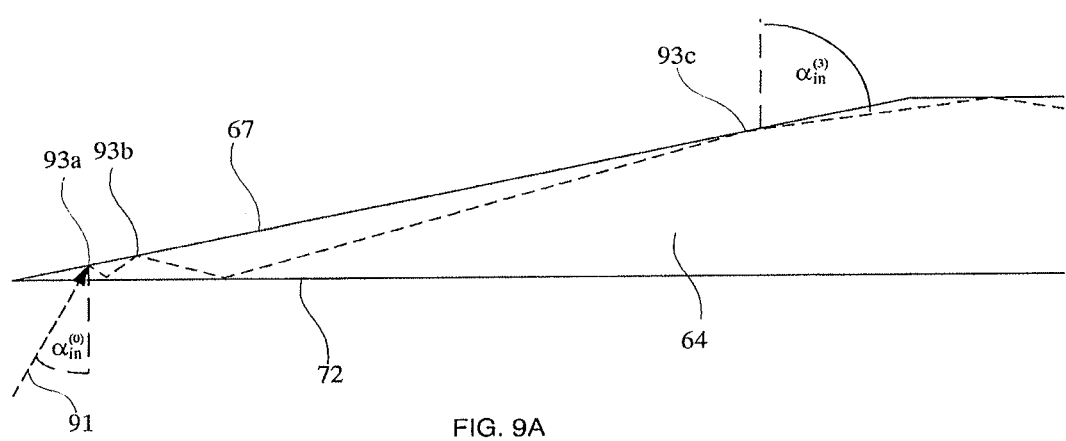

Regarding the output aperture as illustrated in FIG. 9A, a ghost image problem might be accrued at the edge of the reflecting surface 67. As shown, a ray 91 having an off-axis angle $\alpha_{in}^{(0)}$ is traced from the output aperture backward to the input aperture of the substrate 64. The ray 91 impinges on the reflecting surface at point 93a and is reflected not only twice, but rather three times from the reflecting surface 67. As a result, the ray is trapped inside the substrate 64 having an off-axis angle $\alpha_{in}^{(3)}$, which is located in the third order of the coupled-in light waves. As illustrated in FIG. 9A, this angle fulfils the relation $\alpha_{in}^{(3)} > 90° - \alpha_{sur2}$, and as a result, it is not a "legal" angle. As seen, the ray 91 is reflected from the third point 93c not toward the lower major surface 72 but toward the upper surface 70. Therefore, ray 91 will impinge on surface 72 at the angle $$\alpha_{in}^{(3)}(\text{act}) = 180° - \alpha_{in}^{(3)} = 180° - 2\cdot\alpha_{sur2} - \alpha_{in}^{(2)}. \quad (26)$$

As a result, after an odd number of reflections from the major surfaces the ray will be reflected from the input surface 65 at the angle $$\alpha_{in}^{(2)}(\text{act}) = \alpha_{in}^{(3)}(\text{act}) - 2\cdot\alpha_{sur2} = 180° - 4\cdot\alpha_{sur2} - \alpha_{in}^{(2)}. \quad (27)$$

Consequently $$\alpha_{in}^{(0)}(\text{act}) = \alpha_{in}^{(2)}(\text{act}) - 4\cdot\alpha_{sur2} = 180° - 12\cdot\alpha_{sur2} - \alpha_{in}^{(0)}. \quad (28)$$

Evidently, this angle in not necessarily the required angle $\alpha_{in}^{(0)}$. Using, for example, the parameters of the example given above in relation to Eq. (23), and assuming that $\alpha_{in}^{(0)} = 31°$, the actual ray that is coupled into the substrate 64, in order to be coupled-out as ray 91, has the direction of $\alpha_{in}^{(0)}(\text{act}) = 29°$. That is to say, not only is the "right" ray that should be coupled out as ray 91 missing from the image, and consequently, a gap will be formed in the image, but instead there is another ray originated from a "wrong" direction, which creates a ghost image.

Figure 9B:
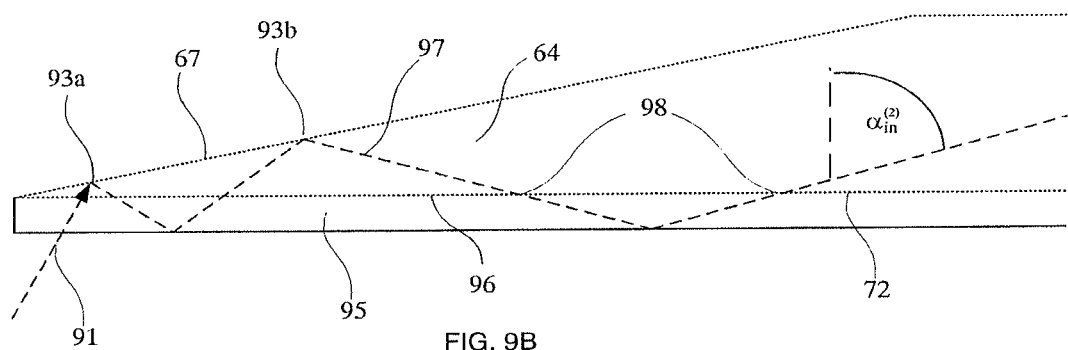

A possible way to overcome this problem is illustrated in FIG. 9B. As shown, a flat transparent plate 95 is cemented to the lower surface 72 of the substrate 64 defining an interface plane 96. The ray 91 is reflected now only twice from surface 67 before being coupled into the substrate 64. Therefore, the coupled ray 97 propagates inside the substrate having an off-axis angle $\alpha_{in}^{(2)}$ which is a "legal" direction, and no ghost image is created in the image. In a case where it is required to minimize the Fresnel reflections of the coupled ray 97 at points 98 from the interface plane 96, it will be preferred to use optical cement having a refractive index similar to that of the substrate 64 and plate 95.

Figure 9C:
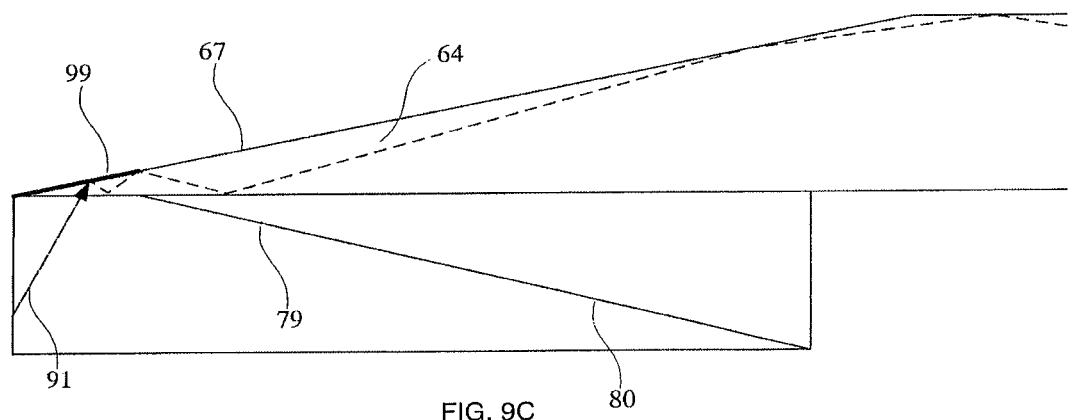

An alternative manner of overcoming the ghost image problem is illustrated in FIG. 9C. Here, the reflecting surface 79 is shifted inside the prism 80 such that it does not cover the entire aperture of the reflecting surface 67. That is to say, the rays that are reflected at the far edge by segment 99 of the reflecting surface 67 are not reflected back to the viewer's eye by surface 79. As a result, part of surface 67 is practically blocked from being active and the segment 99 becomes non-active. Therefore, the ray 91 having the "wrong" direction does not illuminates the viewer's eye and the ghost image is avoided. The exact parameters of the solution to the ghost image problem (if same exists at all), such as which embodiment to use, or whether to use a combination thereof, the thickness of plate 95 or the shift of surface 79 can be determined according to the various parameters of the optical system such as the required measure of the output aperture, the FOV of the system and the desired overall thickness of the substrate.

Figure 9D:
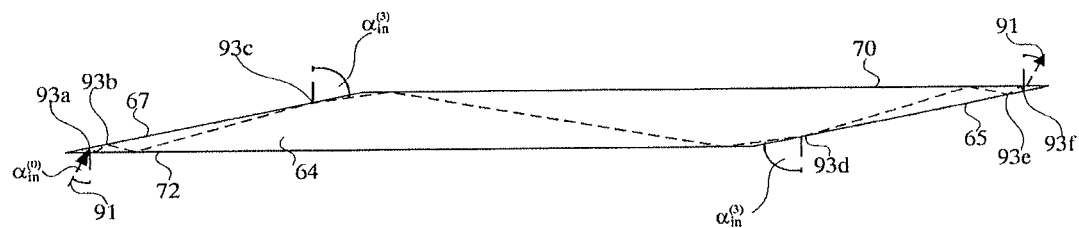

Another alternative for overcoming the ghost image problem is illustrated in FIG. 9D. As illustrated here, the coupled ray 91 impinges on the lower major surface 72 before impinging on the reflecting surface 65 having an off-axis angle $\alpha_{in}^{(3)}$, namely, the same off-axis angle it has while reflected from surface 67 at the third point 93c. As a result, the coupled ray 91 is reflected three times from surface 65 at points 93d, 93e and 93f before being coupled out from the substrate having the off-axis angle $\alpha_{in}^{(1)}$, which is the "proper" angle. In order for the triple reflection from surface 67 to be compensated by a triple reflection from surface 65, it is necessary for the ray to be reflected the same number of reflections from the upper surface 70, as well as from the lower surface 72, namely, if the ray is reflected from surface 67 upward toward surface 70, then it also should be reflected from surface 72 upward toward surface 65. Usually, it is not possible to design the optical system such that all the optical rays which are reflected three times from surface 67 will also be reflected three times from surface 65. Only a small part of the rays which illuminate the segment 99 (FIG. 9c) of surface 67, and consequently, are reflected three times from surface 67, reach the EMB of the optical system. Usually, with a proper selection of the various parameters of the optical system, such as the inclination angle of the reflecting surfaces 65 and 67 and the thickness, the length and the refractive index of the substrate, it is possible to design the system such that for most of the relevant optical rays the triple reflection from surface 67 will be compensated by a triple reflection from surface 65 so that the ghost images and the gaps in the image will be avoided.

Figure 10A:
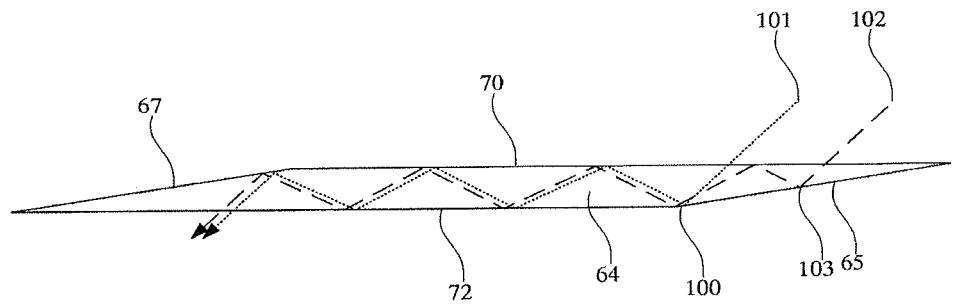

Another issue that should be considered is the required measurement of the input aperture. In order to avoid gaps and stripes in the image it is desired that all the orders of the coupled-in light waves will fill the substrate such that the reflecting surface 67 will be entirely illuminated by the coupled-in light waves. As illustrated in FIG. 10A, to ensure this, the points on the boundary line 100 between the edge of the reflective surface 65 and the lower surface 72 of the substrate 64, should be illuminated for a single light wave by two different rays that enter the substrate in two different locations: a ray 101 (dotted line) that illuminates directly surface 65 at the boundary line 100, and another ray 102 (dashed line) which is first reflected by the reflecting surface 65 at point 103 and then by the upper surface 70 of the substrate 64 before illuminating the lower surface 72 just left to the boundary line. As illustrated, the two rays 101 and 102 from the same point in the display source, which are propagated at the first order inside the substrate, are coupled into the substrate 64 remotely located from each other: 101 at the left edge and 102 approximately at the center of surface 65, respectively. The rays are, however, coupled out by the coupling-out element 67 located adjacent to each other at the right part of surface 67. Therefore, the entire area of surface 65 between points 103 and 100 should be illuminated by the light wave were the rays 101 and 102 originated from. Consequently, this area should be entirely illuminated by all the light waves that are coupled into the substrate.

Figure 10B:
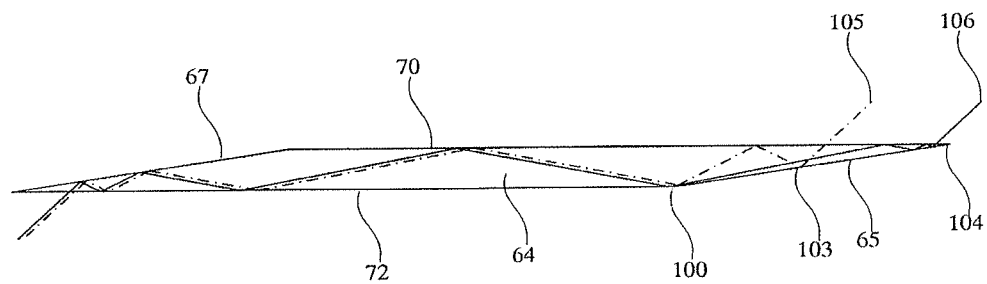

Similarly, as illustrated in FIG. 10B, the points on the boundary line 100 between the edge of the reflective surface 65 and the lower surface 72 should be illuminated for the same single light wave that illustrated above in FIG. 10A, by two other different rays that enter the substrate in two different locations: a ray 105 (dashed-dotted line) that illuminates surface 65 at the boundary line 100 after one reflection from surface 65 at a point located just right to 103 and one reflection from surface 70, and another ray 106 (solid line) which is reflected twice by the reflecting surface 65 and twice by the upper surface 70 of the substrate 64 before illuminating the lower surface 72 just left to the boundary line. As illustrated, the two rays 105 and 106 from the same point in the display source, which are propagating at the second order inside the substrate, are coupled into the substrate 64 remotely located from each other: 105 approximately at the center and 106 close to the right edge of surface 65, respectively. They are, however, coupled out by the coupling-out element 67 located adjacent to each other at the left part of surface 67. Therefore, the entire area of surface 65 between points 103 and the right edge 104 of surface 65 should be illuminated by the light wave, where the rays 105 and 106 originated from. Consequently, this area should be entirely illuminated by all the light waves that are coupled into the substrate. There are two conclusions from FIGS. 10A and 10B:

a. the entire area of surface 65 should be illuminated by light waves that are coupled into the substrate, and;

b. the first order of the coupled light waves illuminates the left part of surface 65 and is coupled out at the right part of surface 67, while the second order of the coupled light waves illuminates the right part of surface 65 and is coupled out at the left part of surface 67.

As illustrated in FIGS. 10A-10B, the aperture of the coupling-in surface 65 is similar to that of the coupling-out surface 67. There are, however, systems having wide FOVs and large EMBs, and therefore, a large output aperture is required. In addition, it is desired that the entire optical system will be as compact as possible. Consequently, it is necessary to minimize the input aperture of the substrate. As a result, there is a contradiction between the opposing requirements of simultaneously achieving a large output aperture along with a small input aperture. Therefore, an appropriate method should be found to reduce the input aperture for a given output aperture, or alternatively, to increase the output aperture for a given input aperture.

Figure 11A:
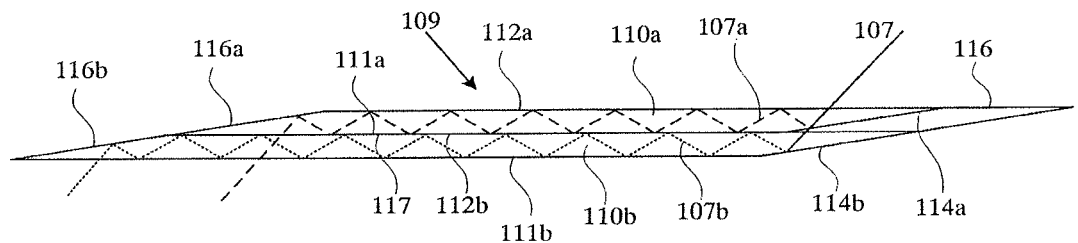
Figure 11B:
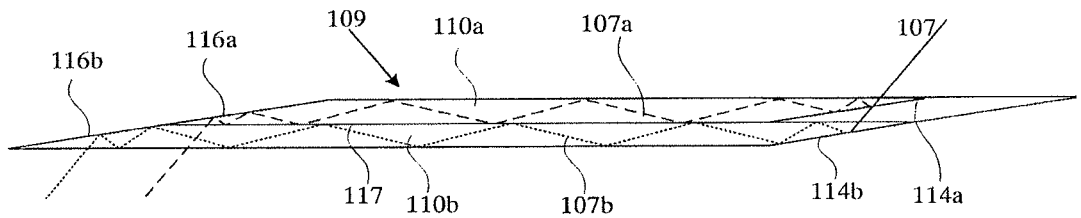

An embodiment for increasing the output aperture for a given input aperture is illustrated in FIGS. 11A-11D. As shown in FIG. 11A, an optical ray 107 having an input direction of $\alpha_{in}^{(0)}$ impinges on an optical element 109 composed of two substrates 110a and 110b, wherein the lower surface 111a of substrate 110a is attached to the upper surface 112b of substrate 110b defining an interface plane 117. Unlike the substrates which are illustrated in FIGS. 4-10, the coupling-in element 114a of the upper substrate 110a is not a simple reflecting surface as surface 65 in substrate 64, but a partially reflecting surface, meaning that the input ray 107 is split into two rays (preferably having the same brightness) 107a and 107b which are reflected from surfaces 114a and 114b and coupled inside substrates 110a and 110b, respectively by total internal reflection. Unlike surface 114a, surface 114b can be a simple reflecting surface. As shown, rays 107a and 107b are reflected once from the left parts of surfaces 114a and 114b, respectively, and propagated inside the substrates in the first order having an angle of $\alpha_{in}^{(1)}$. Consequently, they are coupled out from the substrate by a single reflection from the right parts of the coupling-out surfaces 116a and 116b having an output angle of $\alpha_{in}^{(0)}$. FIG. 11B illustrates the same embodiment where now the input ray 107 impinges on the right side of surfaces 114a and 114b. As a result, rays 107a and 107b are reflected twice from surfaces 114a and 114b, respectively, and propagated inside the substrates in the second order having an angle of $\alpha_{in}^{(2)}$. Consequently, they are coupled out from the substrate by a double reflection from the left parts of the coupling-out surfaces 116a and 116b having an output angle of $\alpha_{in}^{(0)}$. As seen, surface 114a which is practically the input aperture of the optical device 109, has approximately half the size of the output aperture, which is practically the combination of the coupling-out surfaces 116a and 116b together.

There are two contradicting requirements from the interface plane 117 between the substrates 110a and 110b. On the one hand, the first two orders image $F^{(1)}$ and $F^{(2)}$ should be reflected from that plane, while the zero order image $F^{(0)}$ from the upper substrate 110a should substantially pass through it, after being reflected from surface 116a, with no significant reflections. Similarly, surface 117 should be transparent to ray 107b that passes through surface 114a having the input angle of $\alpha_{in}^{(0)}$. In addition, for see-through systems, the transparency of optical device 109 for substantially normal incident light should be as high as possible. A possible way to achieve this is to use an air gap in the interface plane 117. An alternative manner for achieving this while maintaining the rigidness of the device, is to cement substrates 110a and 110b together using the same cementing method which utilizes low-index adhesive, as illustrated hereinabove in relation to the interface plane 83 in FIG. 5D.

Figure 11C:
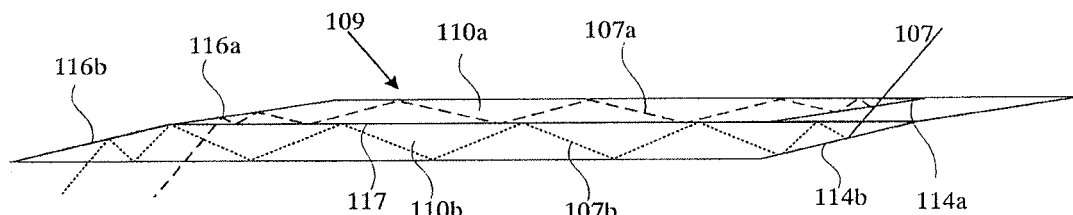

In the embodiment illustrated in FIGS. 11A-11B the two substrates 110a and 110b are similar to each other, i.e., the inclination angles $\alpha_{sur1}$ of the coupling-in devices 114a and 114b, as well as the inclination angles $\alpha_{sur2}$ of the coupling-out devices 116a and 116b, are the same. In addition, the two substrates have the same thickness. It is possible, however, to attach two substrates having two different characteristics. As illustrated in FIG. 11C, the upper substrate 110a has the same parameters as the system illustrated above in relation to Eq. (23). The lower substrate however has the following parameters:

$$\alpha_{sur1}=\alpha_{sur2}=11°;F^{(0)}=\{24°,35°\};F^{(1)}=\{46°,57°\}$$

$$F^{(2)}=\{68°,79°\}. \quad (29)$$

Figure 11D:
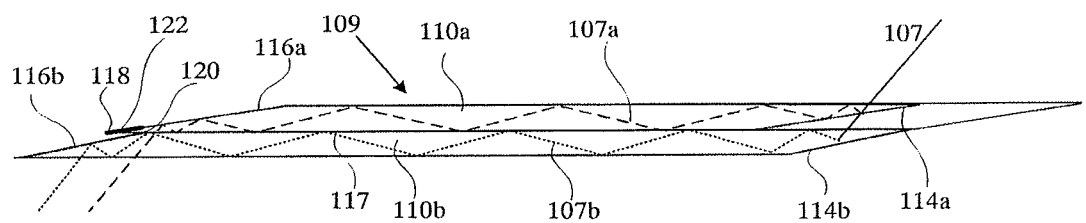

The light waves are s-polarized. The optical material of the substrates 110a and 110b is as before, Schott N-SF57, having a refractive index of $n_d=1.8467$ and the optical adhesive is NOA 1315, having a refractive index of $n_d=1.315$. The critical angle is therefore $\alpha_{cr}>45.4°$. The FOV of the image that is coupled into, and then from, the device 109, is increased from $F^{(0)}=\{30°, 40°\}$ in the single substrate 64 to $F^{(0)}=\{24°, 40°\}$ in the double substrate element 109. All the light waves propagating in the first order and having the combined FOV of $F^{(1)}=\{46°, 60°\}$ have off-axis angles higher than the critical angle, and therefore, they are totally reflected from the interface plane 117 between the substrates. Since the practical output aperture of each substrate directly depends on $\tan \alpha_{sur2}$, the thickness of the lower substrate 110b should be slightly increased, in order to equalize the output apertures of the two substrates. The output aperture of element 109 is doubled as compared to that of the single substrate 64 in FIG. 5A and the FOV is increased by 6°. The penalty is that the thickness of the device is doubled and the brightness of the coupled out image is reduced by 50%. In the event that the left edge of surface 116a is not active, as illustrated above in relation to FIGS. 9A-9C, it is possible to block this part by slightly shifting the lower substrate 110b. As illustrated in FIG. 11D, the reflecting surfaces 116a and 116b are no longer co-linear. The left edge 118 of surface 110a does not coincide with the right edge 120 of substrate 110b, which is slightly shifted rightward, and hence, the inactive part 122 of surface 110a is practically blocked.

Figure 12A:
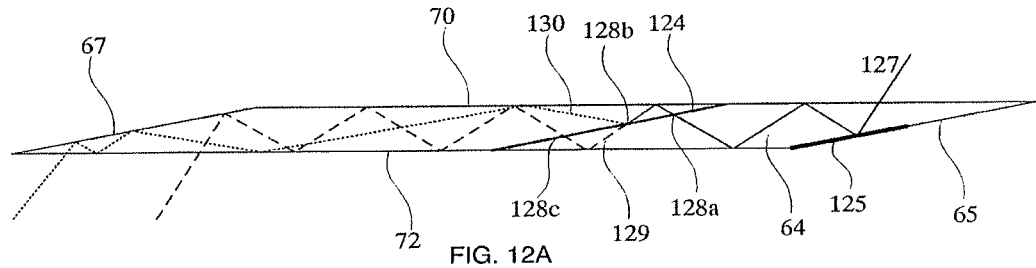
Figure 12B:
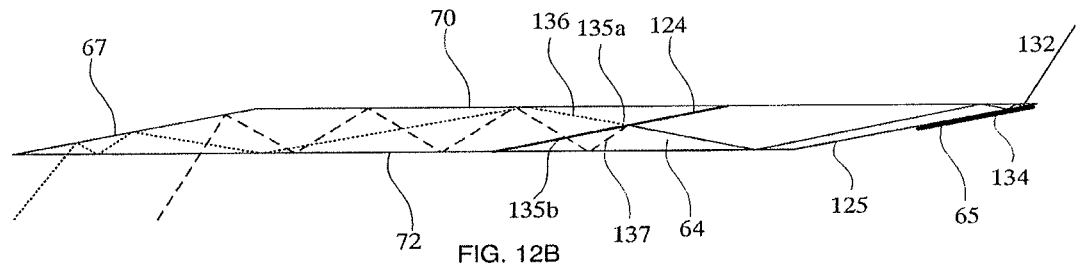

Still an alternative embodiment to practically decrease the input aperture of the optical device is illustrated in FIGS. 12A-12B. Here, the fact that, as illustrated in FIGS. 10A and 10B, the light waves which impinge on the left part of the coupling-in surface 65 are reflected only once from surface 65, and hence, propagate inside the substrate 64 having the first order off-axis angle of $\alpha_{in}^{(1)}$, while the light waves which impinge on the right part of the coupling-in surface 65 are reflected twice from surface 65, and hence, propagate inside the substrate 64 having the second order off-axis angle of $\alpha_{in}^{(2)}$, is exploited. As illustrated in FIG. 12A, an angular sensitive partially reflecting surface 124 is embedded inside the substrate 64. Surface 124 is parallel to the coupling-in surface 65 and the coupling-out surface 67, namely, the inclination angle of surface 124 in relation to the major surfaces of the substrate 64 is:

$$\alpha_{spr} = \alpha_{sur1} = \alpha_{sur2}. \quad (30)$$

For the entire FOV of the image, which is propagating inside the substrate 64, surface 124 is substantially transparent for light waves having an incident angle of $$\alpha_{sp}^{(0)} = \alpha_{in}^{(0)} + \alpha_{spr} = \alpha_{in}^{(1)} - \alpha_{spr} \quad (31)$$

and is substantially, evenly partially, reflective for light waves having an incident angle of $$\alpha_{sp}^{(1)} = \alpha_{in}^{(1)} + \alpha_{spr} = \alpha_{in}^{(2)} - \alpha_{spr}. \quad (32)$$

In addition, it is assumed that only the left part 125 of the coupling-in surface 65 is illuminated by the image's light waves. As illustrated in FIG. 12A, a ray 127 impinges on the left part 125 of surface 65, is coupled into the substrate 64 after one reflection from surface 65, and hence, propagates inside the substrate 64 having the first order off-axis angle of $\alpha_{in}^{(1)}$. After a few reflections from the major surfaces of the substrate 64, the ray 127 impinges on surface 124 at point 128a. Since the ray impinges on the surface from the left side, it behaves similarly to the rays that impinge on surface 67, and hence, Eq. (16) should be used to calculate to incident angle of ray 127 at point 128a. Hence, $$\alpha_{sp}^{(128a)} = \alpha_{in}^{(1)} - \alpha_{spr}. \quad (33)$$

As a result, the condition of Eq. (31) is fulfilled and ray 127 passes through surface 124 without any significant reflectance. After one reflection from the upper major surface 70, ray 127 impinges again on surface 124 at point 128b. Now, the ray impinges on the surface from the right side and it behaves similarly to the rays that impinge on surface 65, and hence, Eq. (15) should be used to calculate to incident angle of ray 127 at point 128b. Thus, $$\alpha_{sp}^{(128b)} = \alpha_{in}^{(1)} + \alpha_{spr}. \quad (34)$$

As a result, the condition of Eq. (32) is fulfilled and ray 127 substantially evenly split by surface 124, namely, approximately half of the intensity of the light ray passes through surface 124 as ray 129 and continues to propagate inside the substrate 124 having the same off-axis angle of $\alpha_{in}^{(1)}$, while the other half of the intensity of the light ray is reflected from surface 124 as ray 130, and continues to propagate inside the substrate 124 having the off-axis angle of $$\alpha_{in}^{(1)} + 2 \cdot \alpha_{spr} = \alpha_{in}^{(1)} + 2 \cdot \alpha_{sur1} = \alpha_{in}^{(2)}. \quad (35)$$

Specifically, ray 130 propagates inside the substrate 64 having the second order off-axis angle of $\alpha_{in}^{(2)}$. After one reflection from the lower major surface 72 of the substrate 64, the ray 129 impinges on surface 124 at the point 128c. Since the ray again impinges on the surface from the left side, it behaves similarly to the rays that impinge on surface 67, and hence, Eq. (16) should again be used to calculate to incident angle of ray 129 at point 128c and, again $$\alpha_{sp}^{(128c)} = \alpha_{in}^{(1)} - \alpha_{spr}, \quad (36)$$

The condition of Eq. (31) is fulfilled, ray 129 passes through surface 124 without any significant reflectance and continues to propagate inside the substrate having the first order off-axis angle. Consequently, if the entire left part 125 of surface 65 is illuminated by all the light waves coupled into the substrate, the substrate 64, as explained above in relation to FIG. 10A, will be filled by the first order of the coupled light waves. After being split by surface 124, part of the light will continue to fill the substrate by the first order, while the part of the light which is reflected by surface 124 will now fill the second order of the coupled light waves. As a result, substantially the entire aperture of the coupling-out surface 67 will be illuminated by the first and the second orders of the coupled waves and the output light waves will be coupled-out from substantially the entire active aperture of surface 67. As a result, while the output aperture remains the entire active aperture of surface 67, the input aperture of the substrate is practically reduced by a half. The penalty is that the brightness of the coupled-out light waves is also reduced by a half.

A similar embodiment for reducing the input aperture by a half is illustrated in FIG. 12B. Here, only the right part of the coupling-in surface 65 is illuminated by the input light waves. As shown, a ray 132 impinges on the right part 134 of surface 65, is coupled into the substrate 64 after two reflections from surface 65, and hence, propagates inside the substrate 64 having the second order off-axis angle of $\alpha_{in}^{(2)}$. After a few reflections from the major surfaces of the substrate 64 the ray 132 impinges on surface 124 at the point 135a. Since the ray impinges on the surface from the left side it behaves similarly to the rays that impinges on surface 67, and hence, Eq. (16) should be used to calculate to incident angle of ray 132 at point 135a. Hence, $$\alpha_{sp}^{(135b)} = \alpha_{in}^{(2)} - \alpha_{spr} = \alpha_{in}^{(1)} + \alpha_{spr}. \quad (37)$$

As a result, the condition of Eq. (32) is fulfilled, and ray 132 is substantially evenly split by surface 124; approximately half of the light ray passes through surface 124 as ray 136 and continues to propagate inside the substrate 124 having the same off-axis angle of $\alpha_{in}^{(2)}$, while the other half of the light ray is reflected from surface 124 as ray 137 and continues to propagate inside the substrate 124 having the off-axis angle of $$\alpha_{in}^{(2)} - 2 \cdot \alpha_{spr} = \alpha_{in}^{(2)} - 2 \cdot \alpha_{sur1} = \alpha_{in}^{(1)}. \quad (38)$$

Specifically, ray 137 propagates inside the substrate 64 having the first order off-axis angle of $\alpha_{in}^{(1)}$. After one reflection from the lower major surface 72 of the substrate 64, the ray 137 impinges on surface 124 at the point 135b. Since the ray impinges on the surface from the left side, it behaves similarly to the rays that impinge on surface 67, and hence, Eq. (16) should be used to calculate to incident angle of ray 127 at point 128c. Thus, $$\alpha_{sp}^{(135b)} = \alpha_{in}^{(1)} - \alpha_{spr}, \quad (39)$$

the condition of Eq. (29) is fulfilled, ray 137 passes through surface 124 without any significant reflectance, and it continues to propagate inside the substrate having the first order off-axis angle.

The practical function of the embodiment illustrated in FIG. 12B is similar to that illustrated in FIG. 12A. Only half of the input aperture 65 is illuminated by the input light waves, while the output light waves are coupled out from the entire aperture of the coupling-out surface 67. The difference is that while in FIG. 12A only the left part 125 of surface 65 is illuminated by the input light waves, in FIG. 12B the right part 134 of surface 65 is used, but the outcome is similar, and the entire output surface is exploited. Usually, the decision as to which part of surface 65 to actually use, depends on the various parameters of the optical system.

The embodiment illustrated in FIGS. 12A-12B, wherein as angular selective reflecting surfaces is embedded inside the substrate 64, can be exploited for other usages, not necessarily for reducing the input aperture. An issue that should be considered is the uniformity of the input light waves that illuminate the input aperture 65. Assuming, for instance, that the brightness of ray 101 in FIG. 10A is lower than that of ray 102, as a result of a non-perfect imaging system, this non similarity will hardly be seen by a direct viewing of the input plane wave, because of the remoteness between the rays. After being coupled into the substrate 64, however, this condition changes and the two rays 101 and 102 propagate inside the substrate 64 adjacent to each other. Consequently, the two rays that are reflected from surface 67 and are coupled out from the substrate, have different brightness. Unlike the input light wave, however, the two rays are now adjacent to each other and this dissimilarity will be easily seen as a dark line in the coupled-out image. The same problem occurs if the brightness of ray 106 in FIG. 10B is lower than that of ray 105, or vice versa.

Figure 12C:
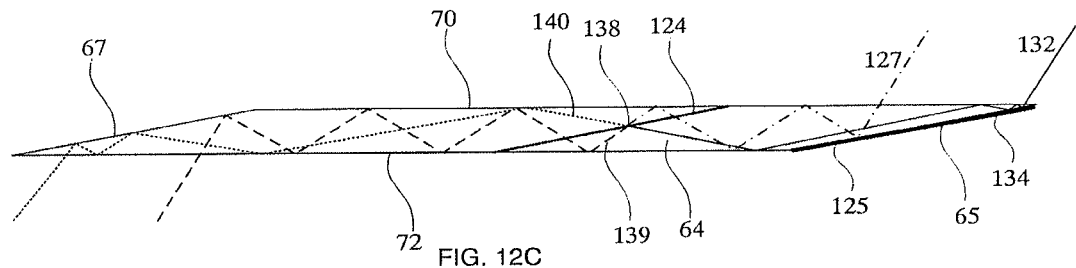

FIG. 12C illustrates an embodiment which overcomes this non-uniformity problem. Here, the same angular sensitive partially reflecting surface 124 is embedded inside the substrate 64, but now the entire input aperture 65 is illuminated by the input light waves. As shown, two different rays, 127 which illuminates the left part 125 close to the center of surface 65, and 132 which illuminates the far edge of the right part 134 (and consequently, have lower brightness than ray 127), are propagated inside the substrate 64 having the first and the second order off-axis angles, respectively. The two rays coincide at point 138 on surface 124 and as explained above in relation to FIGS. 12A and 12B, both of them will be partially reflected by the surface 124 and partially pass through it. As a result, ray 139, which propagates inside the substrate having a first order off-axis angle, will be a mixture of the part of ray 127 which passes through surface 124, and the part of ray 132 which is reflected by the surface. In addition, ray 140, which propagates inside the substrate having a second order off-axis angle, will be a mixture of the part of ray 132 which passes through surface 124 and the part of ray 127 which is reflected by the surface. Rays 139 and 140 are thus mixtures of the original rays 127 and 132, but unlike the original rays, the two rays 139 and 140 which are originated from surface 124 now have a similar brightness. As a result, assuming that the entire aperture of surface 65 is illuminated by the input light waves, the uniformity of the light waves that will originate from surface 124 will have much better uniform distribution over the output aperture than previously, and the non-uniformity issue will be considerably improved.

Another issue that should be considered is the parallelism between the major surfaces of the substrate. As explained above in relation to FIGS. 4A-4B, the two major surfaces of the substrate 64 should be strictly parallel to each other, since any deviation between the incident angles of the trapped light rays on the two major surfaces will cause, at each reflecting cycle, a drift in the off-axis angle $\alpha_{in}^{(i)}$, and since the trapped light rays from the higher order undergo a much smaller number of reflections from the major surfaces of the substrate than those from the lower order, the drift of the low order will be much more noticeable than that of the high order. There are, however, applications wherein a very high resolution is required. In addition, the ratio between the length and the thickness of the substrate can be high, and hence, the number of reflections from the major surfaces of the lower order can be very, and therefore the required parallelism cannot be achieved by conventional fabrication methods.

Figure 12D:
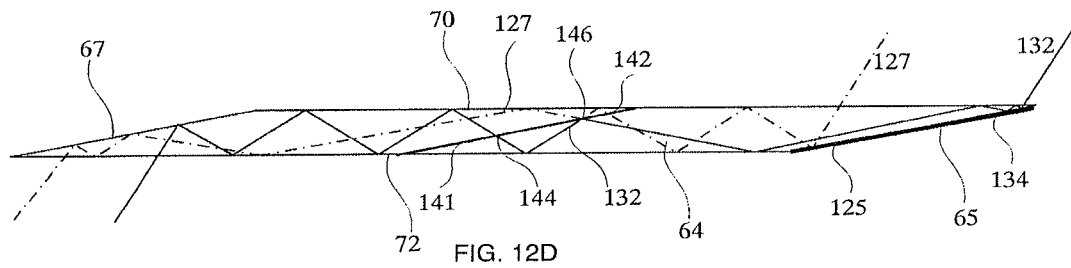

A possible approach for overcoming the above problem is illustrated in FIG. 12D. An angular sensitive reflecting surface 141, which is parallel to surfaces 65 and 67, is embedded inside the substrate 64, but here the reflecting characteristics of this surface are different than that of surface 124 in FIGS. 12A-12C. For the entire FOV of the image which propagates inside the substrate 64, surface 141 is substantially transparent, as previously, for light waves having an incident angle of $$\alpha_{sp}^{(0)} = \alpha_{in}^{(0)} + \alpha_{spr} = \alpha_{in}^{(1)} \alpha_{spr}. \qquad (40)$$

For light waves, however, having an incident angle of $$\alpha_{sp}^{(1)} \alpha_{in}^{(1)} + \alpha_{spr} = \alpha_{in}^{(2)} - \alpha_{spr}, \qquad (41)$$

surface 141 is now substantially reflective. As before, surface 141 will be substantially transparent for the coupled light rays 127 and 132 impinging thereon at points 142 and 144, respectively, having a first order off-axis angle and impinge on the right side of the surfaces. For point 146 however, where rays 127 and 132 coincide together having a first order off-axis angle impinging on the left side of surface 141 and a second order off-axis angle impinging on the right side of surface 141, respectively, surface 141 will be substantially reflective. As a result, rays 127 and 132 will be reflected from surface 141 having a second and a first order off-axis angle, respectively, namely, rays 127 and 132 exchange their off-axis angles at the coinciding point 146. Therefore, assuming that surface 141 is located at the center of substrate 64, evenly positioned between surfaces 65 and 67, rays 127 and 132 undergo a similar number of reflections from the major surfaces of the substrate 64. Assuming that the entire aperture of surface 65 is illuminated by the input light waves, for each input light wave all the coupled rays will have substantially the same number of reflections from the major surfaces of the substrate 64, and the parallelism issue will thus be considerably improved.

The realization of the angular sensitive reflecting surface 124 which is utilized in the embodiments of FIGS. 12A-12C is illustrated hereby with an optical system having the following parameters:

$$\alpha_{sur1} = \alpha_{sur2} = 12°; F^{(0)} = \{21°, 31°\}; F^{(1)} = \{45°, 55°\}$$

$$F^{(2)} = \{69°, 79°\}; \alpha_{sp}^{(0)} = \{33°, 43°\}; \alpha_{sp}^{(1)} = \{57°, 67°\}. \qquad (42)$$

The light waves are s-polarized. The optical material of the substrate 64 is Schott N-SF6 having a refractive index of $n_d$=1.8052, and the optical adhesive which is adjacent to surface 124 is NTT 6205, having a refractive index of $n_d$=1.71.

FIG. 13 illustrates the graph of the reflection from the reflective surface 124 coated with an appropriate angular sensitive dielectric coating as a function of the incident angle for three different wavelengths: 450 nm, 550 nm and 650 nm. As shown, the reflection is approximately 50% for the angular spectrum between 57° and 67°, while it is very low for the incident angles {33°, 43°} of the zero order.

The realization of the angular sensitive reflecting surface 141 utilized in the embodiment of FIG. 12D, is illustrated hereby with an optical system having same the parameters as those presented above in Eq. 42, where the optical adhesive which is adjacent to surface 141 is NOA 165, having a refractive index of $n_d$=1.52.

FIG. 14 illustrates the graph of the reflection from the reflective surface 141 coated with an appropriate angular sensitive dielectric coating as a function of the incident angle for three different wavelengths: 450 nm, 550 nm and 650 nm. As shown, the reflection is 100% for the angular spectrum above 57°, while it is practically zero for the incident angles {33°, 43°} of the zero order.

In all the embodiments illustrated in FIGS. 4-11, the coupling-in element is a slanted reflecting surface. The reason for this is the necessity to couple the first, as well as the second, order of the light waves inside the substrate. For the embodiments illustrated in FIGS. 12A-12B, however, where only the first or the second order is, respectively, coupled into the substrate by the coupling-in element, other optical means can be utilized. As illustrated in FIG. 15A, a prism 148 is optically attached to the upper major surface 70 of the substrate 64. Two light rays 149 and 150 from the same input light wave, impinge on the two edges of the input aperture 152 of the prism 148, where the inclination angle of the light rays inside the prism is $\alpha_{in}^{(1)}$. While the left ray 149 illuminates the upper major surface 70 just right to edge 153 of the prism, the right ray 150 passes through surface 70, is totally reflected from the lower surface 72, and then impinges on the upper surface 72 just left to the edge 153. As a result, the two rays 149 and 150 are coupled inside the substrate 64, having the first order off-axis angle of $\alpha_{in}^{(1)}$, while propagating inside the substrate 64 adjacent to each other. After being partially reflected at points 154 and 156 from surface 124, the reflected rays 158 and 160 propagate inside the substrate 20 adjacent to each other having the second order off-axis angle of $\alpha_{in}^{(2)}$. Consequently, all the rays of the same input light waves covering the input aperture 152, will fill the substrate by the first order light waves, and after being partially reflected from surface 124, will also fill the substrate by the second order light waves. As a result, the output light waves are coupled out from the substrate by the entire active aperture of surface 67. A slightly different embodiment is illustrated in FIG. 15B where the coupling-in element is a prism 162 which is optically attached to a slanted edge 163 of the substrate. As illustrated, in the embodiments of FIGS. 15A and 15B, the input aperture is significantly smaller than that of the embodiments illustrated in FIGS. 4-11. Naturally, realizing modified embodiments wherein light waves having the second order off-axis angles are directly coupled into the substrate utilizing coupling-in prisms similar to those illustrated in FIGS. 15A and 15B, is also possible. In that case light waves having the first order off-axis angles will be created inside the substrate in a method similar to that illustrated in FIG. 12B.

Another issue that should be considered is the uniformity of the light waves that are split by surface 124 in the embodiments of FIGS. 12A-12C. As illustrated, the trapped rays having the first order off-axis angle of $\alpha_{in}^{(1)}$ are partially reflected only once from the left side of surface 124. As illustrated in FIG. 16A, there are rays, however, which are partially reflected twice from surface 124. As shown, ray 164 is first partially reflected from surface 124 at point 165, located in proximity to the intersection between surface 124 and the upper major surface 70. The part of ray 164 which passes through surface 124 at point 165 is reflected from the lower major surface 72, passes through surface 124, is reflected from the upper surface 70 and then is partially reflected again from surface 124 at point 166. Since the brightness of this part of the ray has been already reduced by a half, while splitting at point 165, the brightness of the split rays from point 166 will be approximately 25% of that of the original ray 164, namely, ray 164 has been split into three different rays: ray 164a which is reflected from surface 124 at point 165 and has about a half of the brightness of the original ray 164, and rays 164b and 164c, which pass through surface 164 at point 165 and then pass again, or are reflected, respectively, by surface 164 at point 166, which rays have about a quarter of the brightness of the original ray 164. As a result, there are rays in the image waves which are less bright than the others, and these variations might be seen as dark stripes in the coupled-out image. This phenomenon is negligible for the light waves having the higher off-axis angles in the FOV, but it is, however, more significant for the light waves having the lower off-axis angles.

In order to solve the unevenness problem of the image which is coupled out from the substrate, it is important to understand the difference between this problem and an unevenness problem of a conventional display source which emits a real image from the display plane. Generally, the unevenness of an image, which is projected from a conventional display source, is caused by the non-uniformity of the display itself, e.g., different pixels of the display emit light waves having different intensities. As a result, the only way to solve the unevenness problem is to directly manage the pixels of the display. The cause for the unevenness of the image illustrated hereinabove in relation to FIG. 16A, however, is completely different. Here, the unevenness is caused by a non-uniformity of the different rays of a single light wave, which is associated with a single pixel in the image, meaning that different rays belonging to the same plane light wave, and consequently having the same direction, have different intensities. Therefore, the unevenness of this plane wave can be solved if the various rays of this uneven wave will be mixed together. Hence, a proper mixing arrangement should be advantageously be added to the substrate 64, in order to improve the uniformity of the plane waves, which are trapped inside the substrate by total internal reflection.

As illustrated in FIG. 16B, this unevenness problem may be solved by attaching a flat transparent plate 167 to one of the major surfaces 72 of the substrate 64, wherein a beam-splitting arrangement is applied to the interface plane 168 between the substrate 64 and the transparent plate 167. As illustrated, two light rays, 164 and 169, having different intensities intersect each other at point 170 located at the interface plane 168. Ray 164, which is illustrated above in FIG. 16A, has already been partially reflected by surface 124, and hence, has a lower brightness then the original ray. The other ray 169, which passes through the interface plane at point 171 and is reflected by the lower surface 172 of the plate 167, did not yet pass through surface 124, and hence, it has a higher intensity. As a result of the beam-splitting arrangement which is applied there, each one of the two intersecting rays is partially reflected and partially passes through the interface plane. Consequently, the two rays interchange energies between themselves, and the emerging ray 164d from the intersection point 170 has an intensity which is closer to the average intensity of the two incident rays 164 and 169. As a result, the intensity of ray 164d, which is partially reflected by surface 124 at point 166, is higher than previously and the non-uniformity problem is relaxed. (There are more intersections and splitting of rays 164 and 169 in FIG. 16B but to simplify the figure, only the intersection at point 170 and the emerging of ray 164d from there is plotted). In addition to the mixing of rays 164 and 169 at point 170, rays 164b and 164c which emerged from point 166 are mixed again with other rays (not shown) at points 174 and 175, respectively, on the interface plane 168, and their intensities become even closer to the average intensity of the coupled-out image wave.

The most efficient beam-splitting arrangement is to apply a partially reflecting coating to the interface plane, wherein half of the incoming light wave is transmitted and half is reflected from the surface. In that case, the intensities of the emerging ray 164d are to substantially the average intensity of the two incident rays 164 and 169, and the mixing between the rays is optimal. The main drawback of the coating method, however, is that in order to avoid aberrations and smearing of the image, the direction of the trapped rays inside the substrate should be strictly retained. Therefore, a high degree of parallelism should be maintained for the three reflecting surfaces: the upper surface 70 of the substrate 64, the lower surface 172 of the plate 167 and the interface plane 168. As a result, the external surfaces of the substrate 64 and the plate 167 should have high parallelism and very good optical quality before attaching them together. Applying an optical coating to one of these external surfaces, however, will require a coating process which usually deforms the surfaces of the coated plate, especially if this plate is particularly thin. Another problem is that the light rays which are reflected from surface 67 intersect with the interface plane 168 before being coupled out from the substrate 64. As a result, a simple reflecting coating cannot easily be applied to the interface plane 168, since this plane should also be transparent to the light-waves that exit the substrate 64, as well as transparent to the light wave from the external scene for see-through applications. Thus, the lightwaves should pass through plane 168 without substantial reflections at small incident angles and should be partially reflected at higher incident angles. This requirement complicates the coating procedure and increases the probability that the coated plate will be deformed during the coating process. Consequently, since even a minor deformation will deteriorate the performance of the imaging system, an alternative mixing arrangement should be applied.

An alternative embodiment is illustrated in FIG. 16C. Here, the substrate 64 and the plate 167 are optically cemented using an optical adhesive 176 having a refractive index, which is substantially different than the refractive index of the light transmitting substrate 64 and the flat plate 167. As a result of the differences between the refractive indices and the oblique incident angles of the trapped rays, as compared to the interface plane 168, the Fresnel reflections from plane 168 will be significant and the light waves which are coupled inside the substrate, will be partially reflected from the interface plane. Practically, the incident rays are reflected twice from the interface plane 168, once from the interface plane between the substrate 64 and the adhesive 176, and the second time from the interface plane between the optical adhesive 176 and the transparent plate 167. As illustrated, three different rays 164, 169 and 178 are trapped inside the substrate. The two rays 169 and 178 intersect each other at point 171 which is located at the interface plane 168. As a result of the Fresnel reflections, each one of the two intersecting rays is partially reflected and partially passes through the interface plane. Consequently, the two rays interchange energies between themselves and the emerging rays 179 and 180 from the intersection point 171 have intensities which are closer to the average intensity of the two incident rays 169 and 178. Similarly, the two rays 164 and 179 intersect each other at point 170, interchange energies between themselves and the emerging rays 181 and 182 from the intersection point 170 have intensities which are closer to the average intensity of the two incident rays 164 and 179. Therefore, the three rays 164, 179 and 178, interchange energies during this process and their intensities are now closer to the average intensity. Rays 164 and 178 do not interchange energies directly, but indirectly through the two separate interactions with ray 179, at points 170 and 171.

The optimal mixing will be achieved if the Fresnel reflections from the interface plane 168 are close to 50%. Since, however, Fresnel reflections are very sensitive to the incident angle, it is impossible to find an optical adhesive having a refractive index that yields Fresnel reflection of 50% for the entire FOV of the coupled image, and since the trapped rays intersect not only once, but rather a few times with the interface plane, it is possible to find a mixing arrangement that will be acceptable even for Fresnel reflections which are very different than the optimal value of 50%. The realization of the ray mixing interface plane 167 which is utilized in the embodiments of FIGS. 16B-16C is illustrated herein with an optical system having same parameters as given above in Eq. 42, where the optical adhesive which is used to cement the substrate 64 with the flat plate 167, is NTT-E3341 having a refractive index of $n_d=1.43$.

FIG. 17 illustrates a graph of the reflection from the interface plane 167 as a function of the incident angle for the wavelength 550 nm (the other wavelengths in the photopic region have similar curves) for the entire first order FOV $F^{(1)}=\{45°, 55°\}$. As shown, the reflection is 100% for the angular spectrum above 53° as a result of total internal reflection, and hence, no mixing effect is achieved for these angles. For the entire second order FOV $F^{(2)}=\{69°, 79°\}$, all the light waves are totally internally reflected from the interface plane 168 and no mixing effect is achieved for the entire order. As has been explained above, however, the non-uniformity problem is substantially negligible for the rays having these angles. For the other spectral range of $\alpha_{in}^{(1)}<52°$, the reflection is between 20% and 80%, and a good mixing effect can be achieved. In addition, the device illustrated here is not limited to utilization of a single flat plate. Two or more flat plates, having various thicknesses and refractive indices, can be optically attached to one or both of the major surfaces using various optical adhesives. In any case, the exact parameters of the transparent plates and the adhesives can be used according to the various requirements of the systems.

In the embodiment 109 illustrated in FIGS. 11A-11D, it was assumed that the beamsplitter 114a evenly splits each input ray into two rays, which have substantially the same brightness and are coupled inside substrates 110a and 110b, by total internal reflection. As a result, the beamsplitter 114a is not sensitive to the incidence angle of the input light wave, and in addition, the output brightness is reduced by about 50%. FIGS. 18A-18C illustrate a modified version of device 109, wherein the input beamsplitter 183 is sensitive to the incident angle of the input light waves and, as a result the efficiency of the optical system, is significantly improved and the brightness of the coupled-out image is substantially retained similar to that of the input image. To achieve this improvement, the fact that the light waves which are coupled out from the substrate do not have to illuminate the entire active area of the coupling-out surface, as was done in the embodiments of FIGS. 11A-11D, was utilized.

As illustrated in FIG. 19, showing the rays that should impinge on surface 79 in order to illuminate the EMB 197, the two marginal and the central light waves of the image are coupled out from the substrate and re-directed into the viewer's eye 24. As shown, the light waves 107R, 107M, and 107L, having the zero order off-axis angles $\alpha_{in}^{(0)}(\text{max})$, $\alpha_{in}^{(0)}(\text{mid})$ and $\alpha_{in}^{(0)}(\text{min})$, illuminate only the parts 67R, 67M and 67L of the coupling-out reflecting surface 67, respectively, and are reflected by surface 79 into to EMB 197. As a result, a method can be found where the coupled-in light waves are split in such a way that they will illuminate only the required respective part of surface 67, and the original brightness will be preserved. To achieve this, the angular range of the light waves $F_{sur1}^{(0)} \equiv \{\alpha_{min}, \alpha_{max}\}$, which impinge on the input surface 183 (FIG. 18A), is divided into three substantially equal segments: $F_{low} \equiv \{\alpha_{min}, \alpha_{max}\}$, $F_{mid}^{(0)} \equiv \{\alpha_{m1}, \alpha_{m2}\}$ and $F_{max}^{(0)} \equiv \{\alpha_{m2}, \alpha_{max}\}$. The aim of the embodiment is that the light waves having the higher incident angles in the FOV of $F_{max}^{(0)} = \{\alpha_{m2}, \alpha_{max}\}$ will be coupled out from the upper substrate 110a by the both parts of the coupling-out element 190a and 190b; the light waves having the lower incident angles in the FOV of $F_{min}^{(0)} = \{\alpha_{min}, \alpha_{m1}\}$ will be coupled out from the lower substrate 110b by the both parts of the coupling-out element 190c and 190d, and the light waves in the FOV of $F_{mid}^{(0)} = \{\alpha_{m1}, \alpha_{m1}\}$ will be coupled out from the upper substrate 110a by the lower coupling-out element 190b and from the lower substrate 110b by the upper coupling-out element 190c.

In order to achieve this, surface 183 should substantially reflect all the light waves in $F_{max}^{(0)}$ such that they will be coupled into the upper substrate 110a and substantially transmit all the light waves in $F_{min}^{(0)}$, such that they will be coupled by the reflecting surface 114 into the lower substrate 110b. In addition, part of the light waves in $F_{mid}^{(0)}$ should be reflected by surface 183 in such a way that they will be trapped inside the upper substrate 110a, but will be coupled out only by the lower part of the coupling-out element 190b and part of the light waves in $F_{mid}^{(0)}$ should be pass through surface 183 in such a way that they will be trapped inside the lower substrate 110b but will be coupled out only by the upper part of the coupling-out element 190c. As illustrated in FIGS. 4A and 4B, the light waves which propagate inside the substrate having the first order off-axis angles are coupled out from the substrate by the upper part of the coupling-out element 67, while the light waves propagating inside the substrate having the second order off-axis angles are coupled out from the substrate by the lower part of the coupling-out element 67. Therefore, in order to achieve the coupling-in requirements of the light waves in $F_{mid}^{(0)}$, it is necessary for the light waves in this FOV to be coupled inside the upper substrate 110a having the second order off-axis angles, and hence, will be coupled out by the lower part 190b, and in addition, will be coupled inside the lower substrate 110b having the first order off-axis angles, and hence, will be coupled out by the upper part 190c.

Consequently, the angular sensitive reflecting surface 183 should fulfill the following three characteristics for the entire photopic range:
 a. substantially total reflective for the angular range of $\{\alpha_{m2}, \alpha_{max}\}$;
 b. substantially transparent for the angular range of $\{\alpha_{min}, \alpha_{m1}\}$; and
 c. substantially total reflective for the angular range of $\{\alpha_{m1}, \alpha_{m2}\}$ at the upper part 183a (FIG. 18C) of surface 183 and substantially transparent for the angular range of $\{\alpha_{m1}, \alpha_{m2}\}$ at the lower part 183b (FIG. 18C) of surface 183.

It is possible to achieve these requirements by applying angular sensitive dielectric coatings on surfaces 183a and 183, but the realization process of these coatings can be fairly complicated. A simpler method is to cement surfaces 183a and 183b to the inert part 177 of device 109 using optical adhesives having proper refractive indices that yield critical angles of $\alpha_{m1}$ and, $\alpha_{m2}$ at surfaces 183a and 183b, respectively. The high transparency for angles lower than the respective critical angles can be achieved using proper AR coatings FIG. 18A illustrates two rays 184a and 184b from the same plane input wave having incident angles of $\alpha_{si}^{(0)} < \alpha_{m1}$ which impinge on the lower and the upper parts of surface 183, respectively. As a result of condition (b) described hereinabove, the rays pass through surface 183 and are coupled into the lower substrate 110b by the reflective surface 114 having the first and the second order off-axis angles, respectively. Consequently, the rays are coupled-out from the substrate by the reflective surfaces 190c and 190d, respectively. FIG. 18B illustrates two rays 185a and 185b from the same plane input wave having incident angles of $\alpha_{si}^{(0)} > \alpha_{m2}$ which impinge on the lower and the upper parts of surface 183, respectively. As a result of condition (a) described hereinabove, the rays are reflected from surface 183 and are coupled into the upper substrate 110a having the first and the second order off-axis angles, respectively. Consequently, the rays are coupled-out from the substrate by the reflective surfaces 190a and 190b respectively. FIG. 18C illustrates two rays 186a and 186b from the same plane input wave having incident angles of $\alpha_{m1} < \alpha_{si}^{(0)} < \alpha_{m2}$, which impinge on the surfaces 183b and 183a, respectively. As a result of condition (c) described hereinabove, ray 186b is reflected from surface 183a and is coupled into the upper substrate 110a having the second order off-axis angle. Consequently, the ray is coupled-out from the substrate by the lower reflective surface 190b. In addition, ray 186a passes through surface 183b and is coupled into the lower substrate 110b by the reflective surface 114 having the first order off-axis angle. Consequently, the ray is coupled-out from the substrate by the upper reflective surfaces 190c, as required.

Usually, it will be difficult to cement surface 183 to the inert part 177 such that the two parts 183a and 183b will be cemented to part 177 by two different adhesives, without any cross-talk between the parts. As illustrated in FIG. 18C, a possible way for overcoming this problem is by fabricating substrate 110a of two parallel slices 110aa and 110ab, attached together at the interface plane 189. Three critical issues should be considered during the fabrication process of the upper substrate 110a as a combination of 110aa and 110ab. Firstly, in order to avoid the trapping of the second order light waves in the upper slice 110aa by total internal reflection from the interface plane 189, it is essential that the optical adhesive used to optically attach the slices 110aa and 110ab will have a refractive index close to that of the slices. In addition, in order to prevent distortion of the coupled-out image, the coupling in surfaces 183a and 183b and the coupling-out surfaces 190a and 190b should be strictly co-linear, respectively. Furthermore, since it will be difficult to completely prevent residual Fresnel reflections of the trapped light waves, especially those having the second order off-axis angles, the interface plane 189 should be parallel to the major surfaces 111a and 112a of substrate 110a.

An alternative embodiment to realize the required angular-sensitive beamsplitter is illustrated in FIGS. 20A-20C. As shown, the overall optical device 199 is constructed of four different substrates 191a, 191b, 191c and 191d, which are optically cemented together defining three interface planes, 193a, 193b and 193c, respectively. Another difference from the embodiment of FIGS. 18A-18C is that here the beamsplitters 183a and 183b are interchanged, e.g., surfaces 183a and 183b are cemented to the inert part 177 of element 199 using optical adhesives having proper refractive indices that now yield critical angles of $\alpha_{m1}$ and, $\alpha_{m2}$ at surfaces 183b and 183a, respectively.

FIG. 20A illustrates two rays 184a and 184b from the same plane input wave having incident angles of $\alpha_{si}^{(0)} < \alpha_{m1}$, which impinge on surface 183b and 183a, respectively. As previously, the rays pass through the surfaces and are coupled into the substrates 191d and 191c by the reflective surfaces 195b and 195a, respectively. Although the rays plotted in the figure have only the first order off-axis angles, it is clear that the input light waves illuminate the entire areas of surfaces 195a and 195b, and hence, they fill the entire first and second off-axis angles and as a result illuminate the entire active areas of surfaces 190c and 190d which couple them out of the substrates.

FIG. 20B illustrates two rays 185a and 185b from the same plane input wave having incident angles of $\alpha_{si}^{(0)} > \alpha_{m2}$, which impinge on surface 183b and 183a, respectively. As previously, the rays are reflected from the surfaces and are coupled into the substrates 191b and 191a, respectively. As described above, the input light waves illuminate the entire areas of surfaces 183a and 183b, and hence, they fill the entire first and second off-axis angles and as a result illuminate the entire active areas of surfaces 190a and 190b, which couple them out of the substrates.

FIG. 20C illustrates two rays 186a and 186b from the same plane input wave having incident angles of $\alpha_{m1} < \alpha_{si}^{(0)} < \alpha_{m2}$, which impinge on the surfaces 183b and 183a, respectively. Since the beam-splitting mechanism was interchanged between surfaces 183a and 183b, ray 186a is now reflected from surface 183b, and is coupled into substrate 191b and coupled out by the reflective surface 190b. In addition, ray 186b now passes through surface 183a and is coupled into substrate 191c by the reflective surface 195a, and consequently, is coupled-out from the substrate by the reflective surface 190c as required.

Since each one of the four substrates 191i (i=a, b, c, d) functions independently, there are no longer any constraints on the co-linearity of each adjacent coupling-in and coupling-out surfaces as there were according to the embodiments of FIGS. 18A-18C. The only constraint is that for each separate substrate 191i, the major surfaces and the coupling-in and the coupling-out surfaces should be parallel to each other, respectively. Moreover, each separate substrate can have a different thickness and a different inclination angle according to the requirements of the optical system.

The implementation of the angular sensitive reflecting surfaces 183s and 183b utilized in the embodiments of FIGS. 18A-18C and 20A-20C is illustrated herein with an optical system having the following parameters for substrate 110a of FIGS. 18A-18C and substrates 191a and 191b of FIGS. 20A-20C:

$\alpha_{sur1} = \alpha_{sur2} = 9°; F^{(0)} = \{36°, 46°\}; F^{(1)} = \{54°, 64°\}$ $F^{(2)} = \{72°, 82°\}; \alpha_{sp}^{(0)} = \{45°, 55°\}; \alpha_{sp}^{(1)} = \{63°, 73°\}$, (43)

and the following parameters for substrate 110b of FIGS. 18A-18C and substrates 191c and 191d of FIGS. 20A-20C:

$\alpha_{sur1} = \alpha_{sur2} = 10°; F^{(0)} = \{30°, 40°\}; F^{(1)} = \{50°, 60°\}$ $F^{(2)} = \{70°, 80°\}; \alpha_{sp}^{(0)} = \{40°, 50°\}; \alpha_{sp}^{(1)} = \{60°, 70°\}$. (44)

The light waves are s-polarized. The optical material of the substrate 64 is Schott N-SF57 having a refractive index of $n_d = 1.846$, and the optical adhesives which are adjacent to surfaces 183a and 183b in FIGS. 18A-18C (or surfaces 183b and 183a in FIGS. 20A-20C) are NTT-E3337 and NOA 1315, having refractive indices of $n_d = 1.315$ and $n_d = 1.42$, respectively. The overall FOV of the coupled-in image is $F^{(0)} = \{30°, 46°\}$ (which is practically a FOV of 30° in the air) and the angular range of $F_{sur1}^{(0)} \equiv \{39°, 55°\}$ is divided into three substantially equal segments: $F_{low}^{(0)} \equiv \{39°, 45°\}$, $F_{mid}^{(0)} \equiv \{45°, 50°\}$ and $F_{max}^{(0)} \equiv \{50°, 55°\}$.

FIG. 21A illustrates the graph of the reflection from the reflective surface 183a in FIG. 18C (or surface 183b in FIG. 20C) coated with an appropriate AR dielectric coating as a function of the incident angle for three different wavelengths: 450 nm, 550 nm and 650 nm. As shown, the reflection is 100%, due to total internal reflection, for angular spectrum above 45.6°, while it is very low for the incident angles of {39°, 44.5°}. FIG. 21B illustrates the graph of the reflection from the reflective surface 183b in FIG. 18C (or surface 183a in FIG. 20C) coated with an appropriate AR dielectric coating as a function of the incident angle for three different wavelengths: 450 nm, 550 nm and 650 nm. As shown, the reflection is 100%, due to total internal reflection, for angular spectrum above 50.7°, while it is very low for the incident angles of {39°, 50°}.

FIG. 22 illustrates the two marginal and the central light waves of the image which are coupled out from the substrate and re-directed into the viewer's eye 24. As shown, the light waves 185, 186, and 184, having the zero order off-axis angles of $\alpha_{in}^{(0)}(\max)$, $\alpha_{in}^{(0)}(\text{mid})$ and $\alpha_{in}^{(0)}(\min)$, are illuminating each only the reflection surfaces 190a-190b, 190b-190c and 190c-190d, respectively, and are reflected by surface 79 into to EMB 197. The extent of the EMB 197 is set by the two marginal rays 185R and 184L, which are reflected form the two edges of the overall coupling-out aperture of element 199, and is not influenced at all by the rays 185R and 184L which "moved" to the center of the coupling-out aperture as a result of the new arrangement. Consequently, the EMB 197 of the embodiment which is illustrated in FIGS. 18A-18C and 20A-20C has the same large aperture as the EMB of the embodiment which is illustrated in FIGS. 11A-11C, while the output brightness is doubled.

FIGS. 20A, 20B and 20C illustrate outlines of embodiments comprising two pairs of substrates, wherein the output aperture is increased by a factor of two without reducing the brightness of the projected image. There are systems, however, having a wide FOV and an input aperture remotely located from the EMB, which significantly increases the required input aperture of the main substrate. In these cases, increasing the aperture by a factor of two in not enough and a higher increasing factor is required. To achieve this goal, the above-illustrated increasing method can be generalized to increasing factors of n>2. Assuming that it is required to increase the aperture of the image by a factor of n, n pairs of transparent substrates should be attached together, wherein for each pair the coupling-in, as well as the coupling-out, surfaces should be adjacently located in the same manner as, for example, surfaces 183a and 183b, and 190a and 190b (FIG. 20A), respectively. In addition, all the coupling-out surfaces should be adjacently located as surfaces 190i in embodiment 199. The angular range of the light waves which impinge on the input surface of the upper pair $F_{sur1} \equiv \{\alpha_{min}, \alpha_{max}\}$ is divided now into 2n−1 substantially equal segments, by setting 2n−2 equally separated angles $\alpha_j$. That is, $F_1 \equiv \{\alpha_{min}, \alpha_1\}$, $F_2 \equiv \{\alpha_1, \alpha_2\}$ ... $F_j \equiv \{\alpha_{j-1}, \alpha_j\}$ and $F_{2n-1} \equiv \{\alpha_{2n-2}, \alpha_{max}\}$. Assuming that the substrates are denoted as $S_j$, where j is the running index from bottom (j=1) to top (j=2n), then the coupling-in elements of substrates $S_1$ and $S_2$ from the lower pair are regular reflecting surfaces. All the other 2n−2 coupling-in elements are angular sensitive partially reflecting surfaces fulfilling, for each substrate $S_j$ (j>2), the following conditions for the entire photopic range:

a. substantially totally reflective for the angular range of $\alpha_{si}^{(0)} > \alpha_{j-2}$, and b. substantially transparent for the angular range of $\alpha_{si}^{(0)} < \alpha_{j-2}$.

That is to say, the coupling-in element of substrate $S_j$ should reflect all the impinging light waves having incident angles higher than the limit angle of $\alpha_{j-2}$, to couple these light waves inside substrate $S_j$, and to substantially transmit all the other light waves toward the input aperture of substrate $S_{j-2}$. As explained above, the simplest way to achieve these requirements is to cement each respective coupling-in surface to the adjacent inert part of the embodiment, using optical adhesives having proper refractive indices that yield critical angles of $\alpha_{j-2}$. As previously described, the high transparency for incident angles lower than the respective critical angles, can be achieved using proper AR coatings.

The above illustrated embodiments, comprising n pairs of transparent substrates, will have the following characteristics:

a. aside from the bottom and the top substrates, the light waves which are coupled inside each substrate $S_j$ (j=2 ... 2n−1) are those in the angular range of $\{\alpha_{j-2}, \alpha_j\}$ ($\alpha_{min}$ and $\alpha_{max}$ are denoted here as $\alpha_0$ and $\alpha_{2n-1}$ respectively). The light waves coupled inside substrates $S_1$ and $S_{2n}$ are those in the angular ranges of $\{\alpha_0, \alpha_1\}$ and $\{\alpha_{2n-2}, \alpha_{2n-1}\}$, respectively.

b. each light wave (inside the angular range of the light waves which impinge on the input surface of the upper pair $F_{sur1} \equiv \{\alpha_{min}, \alpha_{max}\}$) having an incident angle of $\alpha_{j-1} < \alpha_s < \alpha_j$ (j=1 ... 2n), is coupled inside two adjacent substrates—$S_j$ and $S_{j+1}$ and is consequently coupled out from the embodiment by the respective coupling-out element $190_j$ and $190_{j+1}$. Therefore, each light wave which is coupled inside the embodiment by total internal reflection, is coupled out by 1/n part of the overall coupling-out element. By a proper design, however, substantially all the coupled light waves will cover the designated EMB of the system.

In all the embodiments illustrated in FIGS. 11-20, one of the outcomes of expanding the output aperture is that the thickness of the optical module is also expanded, accordingly. There are applications however, where it is required to have a large output aperture while still keeping the substrate as thin as possible. FIG. 23A illustrates an embodiment wherein the output aperture is expanded without increasing the substrate's thickness. As shown, an angular sensitive partially reflecting surface 198 is embedded inside the substrate 200. Surface 198 is parallel to the coupling-in surface 65 and the coupling-out surface 67. The inclination angle of surface 198 in relation to the major surfaces of the substrate 200 is:

$$\alpha_{prs} = \alpha_{sur1} = \alpha_{sur2}. \quad (45)$$

For the entire FOV of the image propagating inside the substrate 200, surface 198 is substantially evenly partially reflective, that is, it evenly reflects and transmits the coupled-in light waves having an incident angle of $$\alpha_{sp}^{(0)} = \alpha_{in}^{(0)} + \alpha_{spr} = \alpha_{in}^{(1)} - \alpha_{spr} \quad (46)$$

and is totally reflective for light waves having an incident angle of $$\alpha_{sp}^{(1)} = \alpha_{in}^{(1)} + \alpha_{spr} = \alpha_{in}^{(2)} - \alpha_{spr}. \quad (47)$$

In addition, the surface is substantially transparent for the light waves which are coupled-out from the substrate and re-directed into the viewer's eye, as well as for the light waves from the external scene.

As illustrated in FIG. 23A, a ray 202 is coupled into the substrate 200 after one reflection from surface 65, and hence, propagated inside the substrate 200 having the first order off-axis angle of $\alpha_{in}^{(1)}$. After a few reflections from the major surfaces of the substrate 200, the ray 202 impinges on surface 198 at the point 206a. Since the ray impinges on the surface from the left side, it behaves similarly to the rays that impinge on surface 67, and hence, Eq. (16) should be exploited to calculate to incident angle of ray 202 at point 206a, namely, $$\alpha_{sp}^{(206a)} = \alpha_{in}^{(1)} - \alpha_{spr}. \quad (48)$$

As a result, the condition of Eq. (46) is fulfilled, and ray 202 is substantially evenly split by surface 198, namely, approximately half of the intensity of the light ray 202 is reflected from surface 198 as ray 202a having the off-axis angle of $\alpha_{in}^{(0)}$, and hence, is coupled out from the substrate 200 through the lower surface 72. The other half of the intensity of the light ray 202 passes through surface 198 as ray 202b and continue to propagate inside the substrate 200 having the same off-axis angle of $\alpha_{in}^{(1)}$. After one reflection from the upper major surface 70, ray 202b impinges again on surface 198 at point 206b. Now, the ray impinges on the surface from the right side, and it behaves similarly to the ray that impinges on surface 65, and hence, Eq. (15) should be used to calculate to incident angle of ray 202b at point 206b, so that $$\alpha_{sp}^{(206b)} = \alpha_{in}^{(1)} + \alpha_{spr}. \quad (49)$$

As a result, the condition of Eq. (47) is fulfilled and ray 202b is totally reflected form surface 198, and continues to propagate inside the substrate 200 having the off-axis angle of $$\alpha_{in}^{(1)} + 2 \cdot \alpha_{spr} = +2 \cdot \alpha_{sur1} = \alpha_{in}^{(2)}. \quad (50)$$

Specifically, ray 202b propagates inside the substrate 200 having the second order off-axis angle of $\alpha_{in}^{(2)}$. After two reflections from the coupling-out surface 67, ray 202b is coupled out from substrate 200 having the same off-axis angle $\alpha_{in}^{(0)}$ as ray 202a.

As also illustrated in FIG. 23A, another ray 204 is coupled into the substrate 200 after two reflections from surface 65, and hence, propagates inside the substrate having the second order off-axis angle of $\alpha_{in}^{(2)}$. After a few reflections from the major surfaces of the substrate 64, the ray 204 impinges on surface 198 at point 207a. Since the ray impinges on the surface from the left side and behaves similarly to the rays that impinge on surface 67, Eq. (16) should hence be used to calculate the incident angle of ray 204 at point 207a. Hence, $$\alpha_{sp}^{(207a)} = \alpha_{in}^{(2)} - \alpha_{spr} = \alpha_{in}^{(1)} + \alpha_{spr}. \quad (51)$$

As a result, the condition of Eq. (47) is fulfilled and ray 204 is totally reflected from surface 198 and continues to propagate inside the substrate 200 having the off-axis angle of $$\alpha_{in}^{(2)} - 2 \cdot \alpha_{spr} = \alpha_{in}^{(2)} - 2 \cdot \alpha_{sur1} = \alpha_{in}^{(1)}. \quad (52)$$

Specifically, ray 204 propagates inside the substrate 200 having the first order off-axis angle of $\alpha_{in}^{(1)}$. After one reflection from the lower major surface 72 of the substrate 200, the ray 204 impinges again on surface 198 at the point 207b. Similarly to the behavior of ray 202 at point 206a, ray 204 is substantially evenly split by surface 198. Approximately half of the intensity of the light ray 204 is reflected from surface 198 as ray 204a having the off-axis angle of $\alpha_{in}^{(0)}$, and hence, is coupled out from the substrate 200 through the lower surface 70. The other half of the intensity of the light ray 204 passes through surface 198 as ray 204b and continues to propagate inside the substrate 200 having the same off-axis angle of $\alpha_{in}^{(1)}$. After one reflection from the coupling-out surface 67, ray 204b is coupled out from substrate 200 having the same off-axis angle $\alpha_{in}^{(0)}$ as rays 202a, 202b and 204a. As a result, the output aperture of substrate 200 is the combination of surfaces 198 and 67. Consequently, the practical active area of the output aperture of substrate 200 has been doubled as compared to that of substrate 64, which is illustrated in FIG. 4, while the thickness of the substrate remains the same. On the other hand, the brightness of light waves coupled out from substrate 200 has been reduced by 50% as compared to that of substrate 64.

The expanding embodiment illustrated in FIG. 23A is not limited to one substrate or only one partially reflecting surface. Optical systems which are composed of a few different substrates, or a few different partially reflecting surfaces which are embedded inside a single substrate, are also feasible. FIG. 23B illustrates an optical system 208 wherein two different substrates 210a and 210b are attached together. Two partially reflecting surfaces 212a and 212b, having the same optical characteristics as surface 198 in FIG. 23A, are embedded inside substrates 210a and 210b, respectively. An input ray 214 is split by the beam-splitting surface 216 into two parts: a ray 214a which is coupled by surface 216 into substrate 210a, and ray 214b which passes through surfaces 216 and is coupled by surface 218 into substrate 210b. The coupled rays 214a and 214b are split by surfaces 212a and 212b respectively. The rays 214aa and 214ba are reflected by these surfaces and coupled out from the substrate, while rays 214ab and 214bb pass through theses surfaces and are coupled out from the substrate by the reflecting surfaces 220a and 220b, respectively. As a result, the output aperture of the system 208 is composed of four surfaces: 212a, 212b, 220a and 220b, and the active area of this aperture is expanded accordingly. As shown, in embodiment 208, the coupling-out surfaces 212b and 220b of the lower substrate 210b partially can block, if required, the non-active parts of surfaces 212a and 220a, respectively.

In the embodiments illustrated in FIGS. 23A and 23B, it was assumed that the partially reflecting surfaces which are embedded in the substrates evenly split the intensities of the impinging light waves, namely, the reflectance (and hence, the transmittance) of the surface is 50% for the entire angular spectrum of the coupled image. It should be noted however, that due to the same arguments which were considered in relation to FIGS. 19 and 22, that the light waves having off-axis angles in the upper part of the angular spectrum of the image, are mostly coupled out into the EMB by the partially reflective surface 198, while the light waves having off-axis angles in the lower part of the angular spectrum of the image, are mostly coupled out into the EMB by the reflective surface 67. As a result, it will be advantageous to provide a partially reflective coating on the partially reflecting surface that will have a reflectance higher and lower than 50% for the upper and lower regions of the angular spectrum, respectively. In that case, since the brightness of the light waves in the upper and lower regions depends on the reflectance and transmittance of the partially reflecting surface 198, respectively, it will be higher than 50% for these regions. On the other hand, for the light waves in the central region of the angular spectrum, which are evenly coupled out into the EMB by the partially reflecting surface 198 and the reflecting surface 67, the reflectance and accordingly, the brightness, will be around 50%, which is slightly lower than the brightness at the edges of the image. For most of the back and front illuminated displays, such as LCD and LCOS, however, the illumination, and hence, the brightness of the display sources, are usually stronger at the center of the display. As a result, the non-uniform reflectance curve of the partially reflecting surface can compensate for the non-uniform illumination and in addition the overall brightness of the coupled-out image is improved.

An alternative embodiment 255, wherein the output aperture is expanded without increasing the substrate's thickness and without the necessity to resort to a special partially reflecting coating as required for surface 198, is illustrated in FIG. 23C. As shown, a reflecting surface 256 is embedded inside the substrate 258. Surface 256 has the same reflecting characteristics as surface 67 and is parallel to the coupling-in 65 and the coupling-out 67 surfaces. The inclination angle of surface 256 in relation to the major surfaces of the substrate 258 is:

$$\alpha_{sur3} = \alpha_{sur1} = \alpha_{sur2}. \quad (53)$$

As shown in FIG. 23C, a ray 260 is coupled into the substrate 258 after one reflection from surface 65, and hence, propagates inside the substrate 258 having the first order off-axis angle of $\alpha_{in}^{(1)}$. After a few reflections from the major surfaces of the substrate 258 the ray 260 impinges on surface 256. Since the ray impinges on the surface from the right side, it behaves similarly to the rays that impinges on surface 67, and hence, it is coupled out from the substrate 258 having an off-axis angle $\alpha_{in}^{(0)}$ and is then reflected (or partially reflected in see-through applications) into the viewer's eye similarly to what is illustrated in FIGS. 5A-5C. The reflected ray is, however, not propagated here undisturbed into the viewer's eye, as in the embodiments illustrated in FIGS. 5A-5C. Instead, the reflected ray impinges on a partially reflecting surface 264a, which is parallel to surface 79a, and is coupled inside a flat prism 267, which is attached to the upper surface 70 of the substrate 268 in a similar way that prism 80 is attached to the lower surface 72 of the substrate. Thus, one way to achieve the above is to use an air gap in the interface plane 268 between the prism 267 and the substrate 258, while another way for achieving a rigid system, is to apply an optical adhesive having a proper refractive index in the interface plane 268, in order to cement the prism 268 with the substrate 258. Part of the intensity of the light ray 260 which impinges on surface 264a, passes through the surface as ray 260a, and continues to propagate toward the viewer's eye. Since surfaces 79a and 264a are parallel, the other part of the intensity of the light ray 260 is reflected from surface 264a as ray 260b having an off-axis angle of $\alpha_{in}^{(0)}$ and impinges again on surface 256. The ray impinges on the surface from the left side and behaves similarly to the ray that impinges on surface 65, and hence, after two reflections from surface 256, it propagates inside the substrate 258 having the second order off-axis angle of $\alpha_{in}^{(2)}$. After two reflections from the coupling-out surface 67, the ray 260b is coupled out from substrate 258 having the same off-axis angle $\alpha_{in}^{(0)}$ and is reflected from surface 79d, which is parallel to surface 79a, into the viewer's eye having the same direction as ray 260a.

As also illustrated in FIG. 23C, another ray 262 is coupled into the substrate 258 after two reflections from surface 65 and propagates inside the substrate having the second order off-axis angle of $\alpha_{in}^{(2)}$. After a few reflections from the major surfaces of the substrate 258, the ray 262 impinges on surface 256. The ray impinges on the surface from the right side and behaves similarly to the rays that impinge on surface 67, and hence, is coupled out from the substrate 258 having an off-axis angle $\alpha_{in}^{(0)}$ and is then reflected by surface 79b (or partially reflected in see-through applications), which is parallel to surface 79a, into the viewer's eye in a similar manner to ray 260. The reflected ray impinges on the partially reflecting surface 264b which is parallel to surface 79b and 264a and is coupled inside prism 267. Part of the intensity of the light ray 262, which impinges on surface 264b, passes through the surface as ray 262a and continues to propagate toward the viewer's eye. Since surfaces 79b and 264b are parallel, the other part of the intensity of the light ray 260 is reflected from surface 264b as ray 262b having an off-axis angle of $\alpha_{in}^{(0)}$, and impinges again on surface 256. The ray impinges on the surface from the left side and behaves similarly to the ray that impinges on surface 65, and hence, after one reflection from surface 256 it propagates inside the substrate 258 having the first order off-axis angle of a $\alpha_{in}^{(1)}$. After one reflection from the coupling-out surface 67, the ray 262b is coupled out from substrate 258 having the same off-axis angle $\alpha_{in}^{(0)}$ and is reflected from surface 79c, which is parallel to surface 79b, into the viewer's eye having the same direction as ray 260a. Hence, all of the four rays—260a, 260b, 260a and 262b, which originated from the same point on the display source, reach the viewer's eye having the same propagating direction.

As a result, the output aperture of substrate 258 is the combination of surfaces 256 and 67. Consequently, the practical active area of the output aperture of substrate 258 has been doubled as compared to that of substrate 64, which is illustrated in FIG. 4, while the thickness of the substrate remains the same. On the other hand, the brightness of light waves coupled out from substrate 258 has been reduced as compared to that of substrate 64. There are ways, however, to improve to brightness of the coupled-out light waves. For embodiments wherein the light waves coupled inside the substrate are linearly polarized, such as systems where the display source is an LCD or an LCOS display, the partially reflecting surfaces 79i, as well as 264i (i=a, b, . . . ), can be designed to be polarization-sensitive reflecting surfaces. These surfaces are reflective (or partially reflective) for one polarization (preferably to s-polarization) and substantially transparent to the orthogonal polarization (preferably to p-polarization). In such a case the transmittance of the external scene for see-through applications can be achieved, since the entire element 255 is now substantially transparent to the one polarization (which is orthogonal to that of the light waves coupled inside the substrate). While the reflecting surfaces 79i can be totally reflective for the relevant polarization (which is the same as that of the light waves coupled inside the substrate), surfaces 254i should be partially reflective for this polarization wherein the exact reflection coefficient of the surfaces can be determined according to the number of reflecting surfaces 264i in the system. For the embodiment illustrated in FIG. 23C, wherein two reflective surfaces 256 and 67 are embedded inside the substrate 258, a reflection coefficient of 0.5 can yield a total brightness efficiency of 50% for the light waves coupled inside the substrate and transmittance of 50% for the external scene.

The embodiment for expanding the output aperture by embedding a reflecting surface 256 into the substrate 258, as illustrated in FIG. 23C, is not limited to a single reflecting surface. An array of n flat reflecting surfaces 256i (i=a, b . . . ), which are parallel to the output reflecting surface 67, can be embedded internally inside the substrate to increase the output aperture of the substrate by a factor of n+1. Consequently, the number of the reflecting surfaces 264i (i=a, b . . . ) should be increased accordingly, to completely cover the output aperture of the embedded surfaces 256i. The reflectance and lateral extension of each reflecting surface 264i should be designed to ensure the uniformity characteristics of the light waves coupled into the viewer's eye.

The realization of the partially reflecting surface 198, embedded inside the substrate 200 shown in FIG. 23A, is illustrated herein with an optical system having the following parameters:

$$\alpha_{sur1}=\alpha_{sur2}=10°; F^{(0)}=\{30°,40°\}; F^{(1)}=\{50°,60°\}$$

$$F^{(2)}=\{70°,80°\}; \alpha_{sp}^{(0)}=\{40°,50°\}; \alpha_{sp}^{(1)}=\{60°,70°\}. \tag{53}$$

The light waves are s-polarized. The optical material of the substrate 200 is Schott N-SF57 having a refractive index of $n_d=1.846$, and the optical adhesive which is adjacent to surfaces 198 is NTT-AT9390, having refractive index of $n_d=1.49$, and hence, the critical angle is $\alpha_{cr}=53.5°$. The reflectance of surface 198 is designed to be monotonic increasing from 44% at $\alpha_{sp}^{(0)}=40°$ to 55% at $\alpha_{sp}^{(0)}=50°$.

FIG. 24 illustrates the graph of the reflection from the partially reflecting surface 198 coated with an appropriate dielectric coating as a function of the incident angle for three different wavelengths: 450 nm, 550 nm and 650 nm. As shown, the reflection is 100%, due to total internal reflection, for an angular spectrum of {60°, 70°}. In addition, the reflectance curve increases from 44% at 40° to 55% at 50°, while it is very low for the incident angles below 15°, as required.

FIGS. 5A-5D illustrate embodiments for directing the coupled-out light waves into the viewer's eye 24 where the light waves are reflected back by a reflecting surface 79 and pass again through the substrate 64 toward the viewer's eye. An alternative way, in which the viewer's eye is positioned at the other side of the substrate, is illustrated in FIGS. 25A-25C. As shown in FIG. 25A, four rays, 222a, 222b, 222c and 222d from the same light wave, are coupled into the substrate 64 by the reflecting surface 65, and then coupled out by the surface 67 having the off-axis angle $\alpha_{in}^{(0)}$. The coupled-out light rays are reflected by the reflecting surface 224, which is inclined at an angle of $$\alpha_{ref} = 90° - \frac{\alpha_{in}^{(0)}(cen)}{2}$$

to the lower major surface 72 of the substrate, towards the viewer's eye. The main drawback of this embodiment is that the longitudinal dimension (along the y-axis) of the reflecting surface 224 is big, resulting in a large and cumbersome optical system.

FIG. 25B illustrates an alternative version of this embodiment in which an array of parallel reflecting (or alternatively partially reflecting) surfaces having the same inclination angle as surface 224, is positioned next to the exit aperture of the substrate 64. The array 225 can be embedded inside a transparent prism 226 having preferably refractive index similar to that of the substrate 64. The optical system can now be much more compact than that illustrated in FIG. 25A, depending on the number of the reflecting surfaces in the array 225 and the thickness of prism 226. As shown, the reflecting surfaces illustrated in FIG. 25B are adjacent to each other, i.e., the right side of each surface is adjacent to the left side of the projection of the adjacent surface. There are still a few issues with the proposed embodiment. As shown, ray 222b (dashed line) is reflected by the upper part of surface 225a, which (at least partially) prevents the continuation of the ray 222b' (gray arrow) from reaching the reflecting surface 225b at point 227. As a result, the part of surface 225b below point 227 is blocked by surface 225a and is actually non-active (at least partially, depending on the reflectivity of surface 225a). In addition, the presented arrangement is suitable for the central coupled-out light waves, but not for the light waves having lower off-axis angles. As shown, the coupled-out ray 228 (the part of the ray which is still coupled inside the substrate is not shown here) having the off-axis angle $$-\frac{FOV}{2},$$

is blocked by the lower part of surface 225c.

FIG. 25C illustrates a modified version of this embodiment in which the lower parts of the reflecting surfaces 225 which comprise the non-active parts, are trimmed and the thickness of prism 226 is reduced, accordingly. The main outcome of this version is that the reflecting surfaces 225 are no longer adjacent to each other. As illustrated, the intersection 230 of the coupled-out light waves with lower surface 232 of prism 226 has the form of alternated dark and bright stripes. This significantly reduces the performance of displays which are located at a distance from the eye, such as HUDs, wherein the stripes will be noticeably seen by the viewer's eyes, and hence, this method cannot be utilized for these applications. For near-to-eye displays, the eye integrates the light wave emerging from a single viewing angle and focuses it onto one point on the retina, and since the response curve of the eye is logarithmic, small variations, if any, in the brightness of the display, will not be noticeable. Therefore, if the stripes are dense enough (namely, the lateral dimension of each stripe is significantly smaller than the eye's pupil), and if the eye is positioned close enough to the substrate, the viewer can still experience a high-quality image even with the stripes. Moreover, the active area of the reflecting surfaces 225 can be further trimmed to yield a lower fill-factor of the illuminated areas on surface 232. While the projection 230 of the reflecting surfaces 225 on surface 232 are the areas in which the coupled-out light waves of the projected image pass through towards the viewer's eye, the other non-illuminated areas 234 are the "slits" where the light waves from the external scene can pass through toward the eye, for see-through applications. Consequently, the ratio between the brightness of the projected image and that of the external scene can be controlled by setting the proper fill-factor of the projected areas 230, accordingly. In addition, the reflectance of the reflecting surfaces 225 can be materialized by applying to the surfaces an optical adhesive having refractive index which is lower than that of the prism 226, such that the oblique angles of incident of the coupled-out light waves on the reflecting surfaces 225 will be higher than the critical angle to yield total internal reflection of the light waves from the surfaces. The "trimmed array" embodiment illustrated in FIG. 25C, deflecting the coupled-out light into the viewer's eye, can also be applied to the embodiments illustrated in FIG. 5C. This means that the reflecting surfaces 79i (i=a, b . . . ) will no longer be located adjacent to each other, and the ratio between the brightness of the projected image and that of the external scene will be determined by setting the proper fill-factor of the reflecting surfaces 79i in the prism 80, as well as by setting the reflectance of surfaces 79i. In addition, the "trimmed array" embodiment can also be applied to the multi-reflecting surfaces embodiment illustrated in FIG. 23C. That is to say, the reflecting surfaces 264i (i=a, b . . . ) will no longer be adjacent to each other, and the ratio between the brightness of the light waves passing though the reflecting surfaces 264i to reach the viewer's eye and the light waves which are reflected by these surfaces to be coupled again into the substrate, will be determined by setting the proper fill-factor of the reflecting surfaces 264i in the prism 267, as well as by setting the reflectance of surfaces 264i.

The re-directing embodiment illustrated in FIGS. 25B and 25C is mainly appropriate for embodiments where the coupling-out surfaces are totally reflecting. For embodiments such as those illustrated in FIGS. 23A and 23B, where part of the coupling-out elements are partially reflecting surfaces, care must be taken that light waves from the external scene will not penetrate the partially reflecting surface 200, be reflected by surfaces 225 into the viewer's eye, and hence, create a ghost image.

In all the embodiments illustrated hereinabove, it was assumed that light waves having only the first and the second orders of axis-axis angles, propagate inside the substrate. There are systems, however, having comparatively small FOVs, where even the third order can be utilized. Referring to FIG. 5C and assuming, for example, an optical system having the following parameters:

$$\alpha_{sur1}=\alpha_{sur2}=9°; F'')=\{18°,27°\}; F^{(1)}=\{36°,45°\}$$

$$F^{(2)}=\{54°,63°\}; F^{(3)}=\{72°,81°\} \tag{54}$$

where the light waves are s-polarized, the optical material of the substrate is Schott N-SF57 having a refractive index of $n_d=1.846$, and the optical adhesive which is used to cement the substrate 64 to the prism 80 is NTT-E3337 having refractive index of $n_d=1.42$, wherein the interface plane 83 (FIG. 5D) between substrate 64 and prism 80 covers the entire lower major surface 72. The critical angle of the lower surface is therefore $\alpha_{cr}^{l}=50.3$. The interface between the substrate and the collimating element of the input light waves is an air gap and the critical angle of the upper surface is therefore $\alpha_{cr}^{u}=32.8$. All of the optical rays in the higher orders of $F^{(2)}$ and $F^{(3)}$ have off-axis angles higher than the critical angles and they are therefore totally reflected from the interface plane 83, as well as from the upper surface 70. In addition, the light waves in the first order are totally reflected from the upper surface 70, and hence, they can be used to create the second and the third orders during the coupling-in process. On the other hand, all the optical rays in the first order impinge on the interface plane 83 at an incident angle lower than the critical angle there, and hence, they cannot propagate inside the substrate by total internal reflection. In addition, during the coupling-out process the light waves which are transferred to the first order by the reflections of the higher orders from surface 67 pass through the interface plane 83 and are coupled out from the substrate 64 as the output light waves by the coupling-out element 67. The input light waves are in the zero order of $F^{(0)}$, the output light waves are in the first order of $F^{(1)}$ while the light waves that propagate inside the substrate are in the higher orders of $F^{(2)}$ and $F^{(3)}$. Consequently, since the width of the input light waves required to create the higher orders is much narrower than that of the coupled-out first order, the actual input aperture of the system will be substantially smaller that the output aperture.

As illustrated in FIG. 26, an input ray 250 impinges on substrate 64 having an off-axis angle $\alpha_{in}^{(0)}$. After three reflections from surface 65 at points 252a, 252b and 252c, this ray is coupled inside the substrate and propagates inside it having the third order off-axis angle of $\alpha_{in}^{(3)}$. After a few reflections from the major surfaces of the substrate 64, the ray 250 impinges on surface 67. After two reflections from the surface at points 254a and 254b it is coupled out from the substrate 64 having an off-axis angle $\alpha_{in}^{(1)}$. The light ray 250 is then reflected by surface 79*a*, substantially normal to the substrate's major surface into the viewer's eye 24.

FIGS. 27*a* and 27*b* illustrate a method for fabricating the required transparent substrates. First, a group of prisms 236 is manufactured, having the required dimensions. These prisms can be fabricated from silicate-based materials, such as Schott SF-57 with the conventional techniques of grinding and polishing, or alternatively, they can be made of polymer or sol-gel materials using injection-molding or casting techniques. The appropriate surfaces of these prisms are then coated with the required optical coatings 237. Finally, the prisms are glued together to form the desired substrate 238. In applications in which the quality of the optical surfaces is critical, the final step of polishing the outer surfaces, or at least part of them, can be added to the process.

FIGS. 28*a*-28*e* illustrate another method for fabricating the transparent substrates. A plurality of transparent flat plates 239 coated with the appropriate optical coatings 240 step (a) (if required) are cemented together using the appropriate optical adhesives so as to create a stacked form 242 step (b). A number of segments 244 step (c) are then sliced off the stacked form by cutting, grinding and polishing, to create the desired substrates 246 step (d). Several elements 248 can be cut-off from each slice 246, as shown by a top view of step (e). FIGS. 27 and 28 illustrate methods for fabricating substrates having only two reflecting surfaces. For other embodiments, such as those illustrated in FIG. 12 or 23, where other reflecting surfaces are embedded inside the substrates, a larger number of prisms (FIG. 27) or flat plates (FIG. 28) should be added to the fabrication process accordingly.

FIGS. 5-26 illustrate various features which can be added to the basic configuration illustrated in FIGS. 4A-4B, including: various types of folding reflecting surfaces (FIGS. 5 and 25); external correcting lenses (FIGS. 8A-8C); blocking of the non-active part of the coupling-out elements (FIGS. 9A-9C); a special compensation design (FIG. 9D); combining of a few substrate together (FIGS. 11, 18, 20 and 23B); embedding an angular sensitive reflecting surface in the substrate for reducing the input aperture (FIGS. 12A-12B) or for mixing the coupled-in light waves (FIGS. 12C-12D); adding different coupling-in elements (FIGS. 15A-15B); cementing a thin transparent plate to one (or more) of the major surfaces of the substrate to mix the coupled-in light waves (FIGS. 16B-16C); utilizing angular sensitive coupling-in surfaces for increasing the brightness of the optical system (FIGS. 18 and 20); embedding partially reflecting surfaces inside the substrate or next to the major surfaces of the substrate to increase the output aperture of a single substrate (FIGS. 23A-23C) and using more than two propagation orders of the coupled light waves inside the substrate (FIG. 26). Eventually, any combination of any number of these features can be added together to the basic embodiment which is illustrated in FIGS. 4A-4B, according to the specific requirements of the optical system.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
  a light-transmitting substrate having at least two major surfaces, edges and an output aperture;
  an optical element for coupling light waves into the substrate to effect total internal reflection, and
  at least one optical surface having at least a first and a second side located between the two major surfaces of the light-transmitting substrate for coupling light waves out of the substrate,
  wherein light waves trapped inside the substrate impinge at least twice on the first side of the optical surface before being coupled out from the substrate through the output aperture, and are substantially reflected from one of the major surfaces between the first and second impingements on the optical surface,
  the light waves are totally reflected at the first impingement from the optical surface, and substantially partially reflected from the optical surface and substantially partially transmitted through the optical surface, at the second impingement on the optical surface.

2. The optical device according to claim 1, wherein the part of the light waves reflected from the optical surface at the second impingement is coupled out from the substrate.

3. The optical device according to claim 1, wherein the light waves impinging twice on the optical surface are totally reflected twice from the optical element before being coupled into the substrate.

4. The optical device according to claim 3, wherein light waves are reflected only once from the optical element before being coupled into the substrate and impinge only once on the optical surface, and wherein the light waves are substantially partially reflected and substantially partially transmitted through the optical surface.

5. The optical device according to claim 4, wherein the part of the light waves passing through the optical surface is reflected once from one of the major surfaces and once from the second side of the optical surface, before being coupled again into the substrate.

6. The optical device according to claim 5, wherein light waves having the same input angle on the substrate that are reflected once and twice from the optical element, are coupled out from the substrate by the optical surface at the same output angle.

7. The optical device according to claim 1, wherein the major surfaces of the substrate are parallel to each other, and the light waves trapped inside the substrate are plane light waves.

8. The optical device according to claim 7, wherein different light rays from the same plane wave trapped inside the substrate, propagate inside the substrate with two different off-axis angles in relation to the normal, to at least one of the major surfaces of the substrate.

9. The optical device according to claim 7, wherein the optical element for coupling light waves into the substrate, is a reflecting surface carried on a slanted edge of the substrate and parallel to the optical surface.

10. The optical device according to claim 9, further comprising a second light-transmitting substrate having at least two parallel major surfaces and edges, an optical element for coupling light waves into the second substrate to effect total internal reflection and at least one optical surface located between the two major surfaces of the second light-transmitting substrate for coupling light waves out of the second substrate, wherein at least part of the light waves impinging on the reflecting surface is coupled into the first substrate and at least part of the light waves impinging on the reflecting surface, is transmitted through the surface and coupled into the second substrate.

11. The optical device according to claim 10, wherein the two substrates are optically cemented to each other by means of an optical adhesive and the refractive index of the optical adhesive is substantially lower than the refractive index of at least one of the substrates.

12. The optical device according to claim 10, wherein the reflecting surface is an angular sensitive reflecting surface.

13. The optical device according to claim 9, wherein different light rays from the same plane light wave trapped inside the substrate, are reflected by the reflecting surface a different number of reflections before being coupled into the substrate.

14. The optical device according to claim 7, wherein different light rays from the same plane light wave trapped inside the substrate, are reflected by the first side of the optical surface a different number of reflections, before being coupled out from the substrate through the output aperture.

* * * * *